United States Patent
Kim et al.

(10) Patent No.: US 10,560,953 B2
(45) Date of Patent: Feb. 11, 2020

(54) ANTENNA TUNING DEVICES AND ANTENNA TUNING METHODS

(71) Applicant: Samsung Electronics Co., Ltd., Suwon-si, Gyeonggi-do (KR)

(72) Inventors: Dae-young Kim, Yongin-si (KR); Min-goo Kim, Hwaseong-si (KR); Joo-hyun Do, Seoul (KR); Young-ik Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 28 days.

(21) Appl. No.: 15/875,329

(22) Filed: Jan. 19, 2018

(65) Prior Publication Data

US 2018/0242334 A1 Aug. 23, 2018

(30) Foreign Application Priority Data

Feb. 20, 2017 (KR) .......................... 10-2017-0022335
Sep. 15, 2017 (KR) .......................... 10-2017-0118852

(51) Int. Cl.
*H04W 72/08* (2009.01)
*H04W 72/04* (2009.01)
*H01Q 3/26* (2006.01)

(52) U.S. Cl.
CPC ..... *H04W 72/085* (2013.01); *H04W 72/0446* (2013.01); *H01Q 3/267* (2013.01); *H04W 72/046* (2013.01); *H04W 72/0453* (2013.01)

(58) Field of Classification Search
CPC .......... H04W 72/085; H04W 72/0446; H04W 72/0453; H04W 72/046; H04B 1/00; H04B 1/0458; H01Q 3/267
See application file for complete search history.

(56) References Cited

U.S. PATENT DOCUMENTS

| | | | |
|---|---|---|---|
| 5,564,086 A * | 10/1996 | Cygan | H04B 1/0458 333/17.3 |
| 6,917,790 B1 | 7/2005 | Braun et al. | |
| 6,961,368 B2 | 11/2005 | Dent et al. | |
| 7,831,226 B2 | 11/2010 | Kwon et al. | |
| 8,233,851 B2 | 7/2012 | Jeon et al. | |
| 8,712,340 B2 | 4/2014 | Hoirup et al. | |
| 9,203,500 B2 | 12/2015 | Danak et al. | |

(Continued)

*Primary Examiner* — Nguyen T Vo
(74) *Attorney, Agent, or Firm* — Harness, Dickey & Pierce, P.L.C.

(57) ABSTRACT

Antenna tuning may include performing multiple sampling on a transmission signal applied to an antenna and a reception signal corresponding to the transmission signal during a period for which a first frequency is allocated to the transmission signal, such that sampling data are generated based on the multiple sampling, the sampling data including data corresponding to the transmission signal and data corresponding to the reception signal. The method may include calculating a parameter based on the sampling data, and tuning the antenna based on the parameter. A device may include a control circuit to perform the multiple sampling and set a tuning value, a radio frequency front-end to modulate the transmission signal based on the frequency and apply a return signal of the transmission signal or a reflection signal, and an antenna tuner to adjust a resonance frequency or an impedance of the antenna according to the tuning value.

12 Claims, 23 Drawing Sheets

(56) References Cited

U.S. PATENT DOCUMENTS

| | | |
|---|---|---|
| 9,331,663 B2 | 5/2016 | Suzuki |
| 9,548,734 B1 | 1/2017 | Song et al. |
| 9,559,731 B2 | 1/2017 | Jeon et al. |
| 2002/0101907 A1* | 8/2002 | Dent ........................ H03F 3/24 375/132 |
| 2013/0271342 A1 | 10/2013 | Shen |
| 2014/0247112 A1 | 9/2014 | Bassali |
| 2014/0349593 A1* | 11/2014 | Danak ...................... H04B 1/40 455/77 |
| 2015/0123870 A1 | 5/2015 | Spears et al. |
| 2016/0126619 A1 | 5/2016 | Tenbroek et al. |

\* cited by examiner

ANTENNA TUNING DEVICES AND ANTENNA TUNING METHODS

CROSS-REFERENCE TO RELATED APPLICATIONS

This application claims the benefit, under 35 U.S.C. § 119, of each of Korean Patent Application No. 10-2017-0022335, filed on Feb. 20, 2017 in the Korean Intellectual Property Office, and Korean Patent Application No. 10-2017-0118852, filed on Sep. 15, 2017 in the Korean Intellectual Property Office, the disclosures of each of which are incorporated herein in their entirety by reference.

BACKGROUND

The inventive concepts relate to wireless communication equipment, and more particularly, to antenna tuning devices provided ("included") in wireless communication equipment and tuning methods of ("associated with") antenna tuning devices.

In wireless communication equipment, the performance of an antenna affects efficiency of the wireless communication equipment with regard to wireless signal transmissions. The performance of the antenna may vary any time according to an environment in which the wireless communication equipment is used. For example, assuming that a terminal including a metal case is used, an impedance mismatch of the antenna may occur when an external environment is changed (e.g., when a hand-grip is performed, a universal serial bus (USB) is used, or an earphone jack is connected), a resonance frequency of the antenna may be changed, and antenna output efficiency may be reduced. As a result, the terminal may fail to deliver maximum power, power consumption may be increased, total radiated power (TRP) may be reduced, and a call drop may occur at a cell boundary.

SUMMARY

In some example embodiments, the inventive concepts provide one or more antenna tuning devices and/or one or more antenna tuning methods that improve the performance of an antenna based on implementing antenna tuning that includes measuring an impedance of the antenna in real time and compensating for changes in a resonance frequency and an impedance mismatch.

The inventive concepts provide antenna tuning devices and antenna tuning methods which may improve antenna output efficiency by increasing the accuracy of antenna tuning in a communication environment in which a frequency of a signal transmitted through an antenna is periodically changed.

According to some example embodiments of the inventive concepts, an antenna tuning method of wireless communication equipment may include performing multiple sampling on a transmission signal applied to an antenna and a reception signal corresponding to the transmission signal during a measurement period for which a first frequency is allocated to the transmission signal, such that a plurality of instances of sampling data are generated based on the multiple sampling, each instance of sampling data including data corresponding to the transmission signal and data corresponding to the reception signal. The antenna tuning method may further include calculating a parameter associated with antenna tuning based on the plurality of instances of sampling data and tuning the antenna based on the parameter.

According to some example embodiments of the inventive concepts, an operation method of an antenna tuning device may include generating first sampling data based on sampling a forward reception signal corresponding to a transmission signal allocated to a first frequency applied to an antenna, generating second sampling data based on sampling a reverse reception signal corresponding to a reflection signal of the transmission signal, calculating a reflection coefficient based on the first sampling data and the second sampling data, compensating for the reflection coefficient based on a reference frequency; and setting a tuning value associated with compensating for an impedance mismatch of the antenna based on the reflection coefficient.

According to some example embodiments of the inventive concepts, an antenna tuning device may include a tuning control circuit configured to perform multiple sampling on a transmission signal applied to an antenna and a reception signal corresponding to the transmission signal during a measurement period for which a frequency allocated to the transmission signal is substantially constant, and set a tuning value based on sampling data generated based on the multiple sampling. The antenna tuning device may further include a radio frequency (RF) front-end configured to modulate the transmission signal based on the frequency allocated to the transmission signal and apply a return signal of the transmission signal or a reflection signal output based on the transmission signal being reflected from the antenna as the reception signal. The antenna tuning device may further include an antenna tuner configured to adjust a resonance frequency or an impedance of the antenna according to the tuning value.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

The inventive concepts will now be described more fully with reference to the accompanying drawings, in which example embodiments of the inventive concepts are shown.

Figure 1:
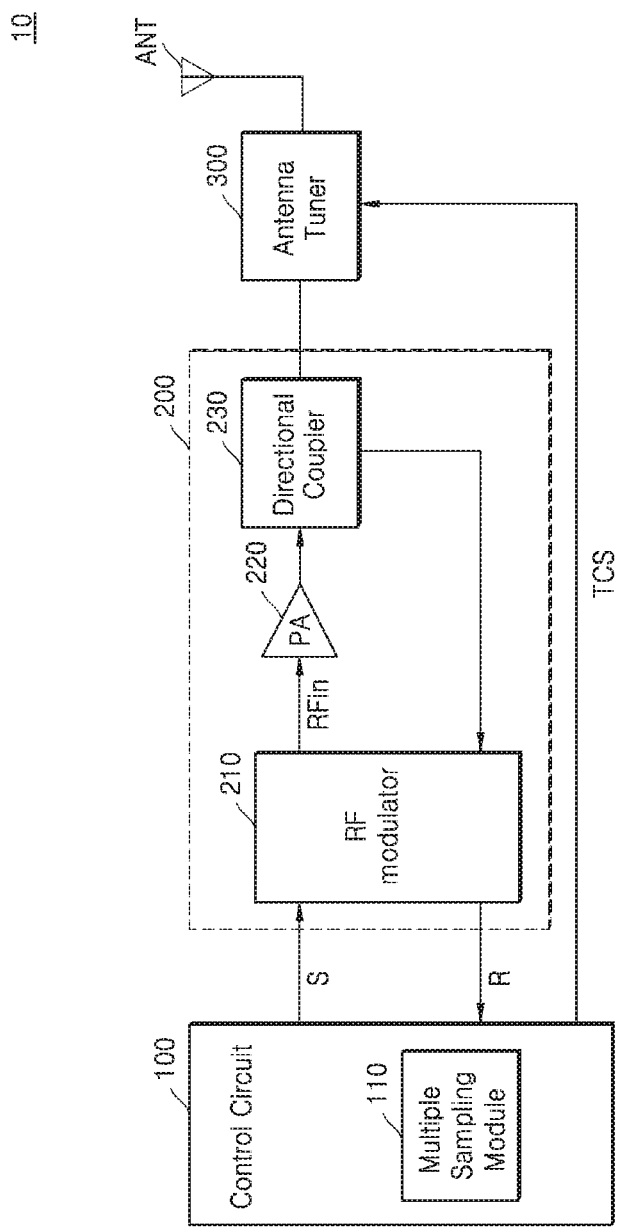
FIG. 1 is a block diagram of an antenna tuning device according to some example embodiments.

FIG. 1 is a block diagram of an antenna tuning device 10 according to some example embodiments.

The antenna tuning device 10 according to some example embodiments may be mounted on wireless communication equipment. The wireless communication equipment may include a mobile electronic device including a smartphone, a tablet personal computer (PC), a mobile medical device, a camera, or a wearable device. However, example embodiments are not limited thereto, and the wireless communication equipment may include any of various electronic devices operating in an environment where an impedance and/or a resonance frequency of an antenna used for wireless communication is changed.

Referring to FIG. 1, the antenna tuning device 10 may include a control circuit 100 (also called a "tuning control circuit"), a radio frequency (RF) front-end 200, and an antenna tuner 300.

As described herein, control circuit 100 may include one or more elements, modules, and the like. Each module, element, and the like of the control circuit 100, as described herein with regard to any of the drawings, may include one or more instances of hardware (e.g., electronic circuitry) configured to implement the functionality of the given module, element and the like as described herein. Restated, in some example embodiments, the control circuit 100 may include one or more instances of hardware (e.g., electronic circuitry) collectively configured to implement the functionality of some or all of the modules, elements, and the like of the control circuitry 100 as illustrated and described with reference to the drawings.

As described herein, one or more instances of hardware of the control circuit 100 that may implement the functionality of some or all of the modules, elements and the like of control circuit 100 as shown herein may include a memory storing a program of instructions and a processor that is configured to execute the program of instructions stored on the memory to implement the aforementioned functionality.

The antenna tuner 300 may dynamically adjust an internal impedance under the control of the control circuit 100 in order to reduce and/or minimize a signal reflected from an antenna ANT. In some example embodiments, the antenna tuner 300 may include an impedance tuner (also called an impedance matching circuit) and/or an aperture tuner. The aperture tuner may be an element included in the antenna ANT. According to some example embodiments, the impedance tuner may also be included in the antenna ANT. The antenna tuner 300 may be configured to adjust a resonance frequency or an impedance of the antenna ANT according to a tuning value, as described herein.

The RF front-end 200 may include an RF modulator 210, a power amplifier 220, and a directional coupler 230. Each of the elements included in the RF front end 200, including the RF modulator 210, the power amplifier 220, and the directional coupler 230 may include separate, respective instances of hardware, including separate, respective instances of electronic circuitry. The RF front-end 200 may further include other elements (e.g., a filter, a phase shifter, and a duplexer). The RF modulator 210 may generate an RF transmission signal RFin by ("based on") up-converting a frequency of a transmission signal S. The power amplifier 220 may amplify a power of the RF transmission signal RFin. The directional coupler 230 may apply the RF transmission signal RFin with the amplified power to the antenna ANT through the antenna tuner 300. Also, as shown in FIG. 1, the directional coupler 230 may apply a feedback signal of the RF transmission signal RFin to the RF modulator 210. For example, the directional coupler 230 may apply a reflection signal from the antenna ANT or a return signal of the RF transmission signal RFin to the RF modulator 210. The RF modulator 210 may generate a reception signal R by down-converting a frequency of a signal received from the directional coupler 230 and may apply the reception signal R to the control circuit 100. Thus, the RF front-end 200 may be configured to modulate the transmission signal S based on the frequency allocated to the transmission signal S and apply a return signal of the transmission signal S or a reflection signal output based on the transmission signal S being reflected from the antenna ANT as the reception signal R. The directional coupler 230 may be configured to output the return signal of the RF transmission signal RFin or the reflection signal from the antenna ANT according to a direction, where the direction is set based on a control signal applied from the control circuit 100. As described further herein, the direction may be changed in each sampling period (e.g., measurement period) in which multiple sampling is performed.

And The control circuit 100 may ("may be configured to") generate a tuning control signal TCS for ("to implement") antenna tuning, for example, impedance matching and/or resonance frequency adjustment based on the transmission signal S applied to the antenna ANT and the reception signal R corresponding to the transmission signal S, and may apply the tuning control signal TCS to the antenna tuner 300. The reception signal R that is a feedback signal corresponding to the transmission signal S may be one signal from among a forward signal and a reverse signal of the transmission signal S.

The forward signal may be a return signal obtained when the transmission signal S transmitted to the antenna ANT returns, and the reverse signal may be a reflection signal output when the transmission signal S is reflected from the antenna ANT. As described above, the reception signal R may include a signal obtained ("generated") by down-converting a frequency of a feedback signal of the RF transmission signal RFin. The transmission signal S and the reception signal R may be baseband signals. The reception signal R may be a reflection signal of the transmission signal S.

When antenna tuning is commanded or periodically, the control circuit 100 may measure a parameter related to ("associated with") antenna tuning in real time. The control circuit 100 may perform multiple sampling on the transmission signal S and the reception signal R within a particular (or, alternatively, predetermined) measurement period (time interval), and may calculate a parameter related to ("associated with") the antenna ANT. To this end, the control circuit 100 may include a multiple sampling module 110. As described herein, the multiple sampling module 110 may include one or more instances of hardware (e.g., electronic circuitry) configured to implement the functionality of the multiple sampling module 110 as described herein. In some example embodiments, the control circuit 100 may include one or more instances of hardware (e.g., electronic circuitry) configured to implement the functionality of the multiple sample module 110 as described herein.

The multiple sampling module 110 may perform multiple sampling on the transmission signal S and the reception signal R within the measurement period. In some example embodiments, a period for which the RF transmission signal RFin obtained by up-converting a frequency of the transmission signal S maintains the same frequency may be set as the measurement period. For example, when the antenna tuning device 10 is mounted on an electronic device that supports communication through long-term evolution (LTE™) or 3$^{rd}$ generation (3G), one slot may correspond to the measurement period.

The control circuit 100 may calculate a parameter including a similar reflection coefficient or a voltage standing wave ratio (VSWR) based on data obtained by the multiple sampling, and may set a tuning value or generate the tuning control signal TCS based on the parameter. Restated, the control circuit 100 may set a tuning value based on sampling data obtained by the multiple sampling. In some example embodiments, the similar reflection coefficient is a value similar to a reflection coefficient. The similar reflection coefficient used herein may be interchangeably used with the reflection coefficient or a measured reflection coefficient.

A magnitude and a phase of the parameter related to the antenna ANT including the reflection coefficient or the VSWR varies according to a frequency of the parameter. In some example embodiments, a frequency of the parameter refers to a frequency of the RF transmission signal RFin based on which the parameter is calculated. A frequency related to ("associated with") a configuration described in the inventive concepts refers to a frequency of the RF transmission signal RFin related to the configuration. When the parameter is calculated based on pieces of data sampled at different frequencies, it is difficult for the calculated parameter to accurately reflect frequency characteristics of the antenna ANT.

In a communication method using multiple carrier frequencies including orthogonal frequency-division multiplexing (OFDM), a frequency to which data is allocated, in other words, a frequency of the RF transmission signal RFin, may vary with time. For example, a sub-carrier frequency allocated to a transmission signal may vary with time. Accordingly, since measured parameters may have a magnitude deviation and a phase deviation according to a frequency of the parameters, the parameters may be compensated based on a representative frequency (also called a reference frequency).

However, when a parameter is calculated based on data sampled at different frequencies, the parameter may fail to accurately reflect frequency characteristics of the antenna ANT and thus it may be difficult to compensate for the parameter. Furthermore, when a parameter calculated at one frequency is compared with a parameter calculated at another frequency, a wrong tuning value may be set due to different frequency conditions, thereby degrading the performance of the antenna ANT.

Accordingly, since the control circuit 100 of the antenna tuning device 10 according to some example embodiments performs multiple sampling on the transmission signal S and the reception signal R within a measurement period for which a frequency is maintained and calculates a parameter based on sampling data obtained by the multiple sampling, the parameter may accurately reflect frequency characteristics of the antenna ANT. Accordingly, the antenna tuning device 10 may easily compensate for the parameter. Also, even when a plurality of parameter values are generated based on data obtained by multiple sampling and a tuning value is obtained by comparing the plurality of parameter values, the antenna tuning device 10 may obtain an optimal tuning value by comparing the plurality of parameter values generated at the same frequency.

Figure 2:
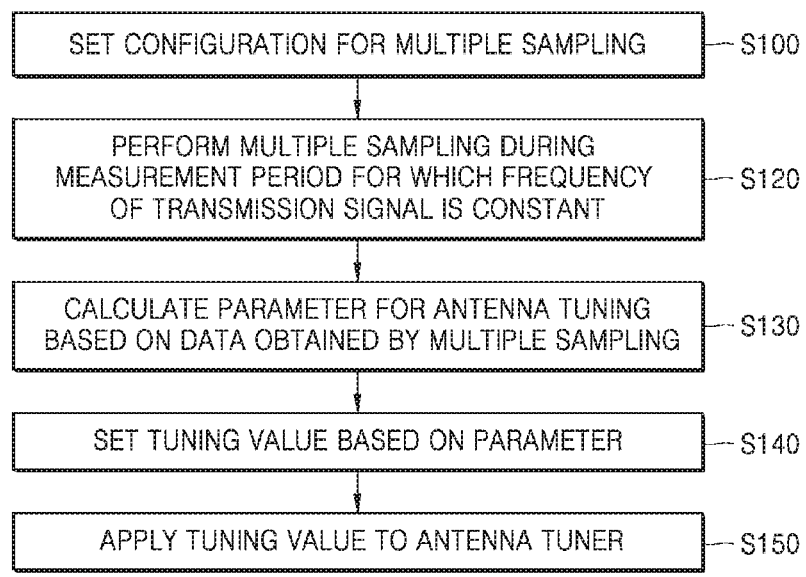
FIG. 2 is a flowchart of an antenna tuning method according to some example embodiments.

FIG. 2 is a flowchart of an antenna tuning method according to some example embodiments. The antenna tuning method of FIG. 2 may be performed by an antenna tuning device (e.g., the antenna tuning device 10 of FIG. 1) of wireless communication equipment, for example, a mobile terminal.

Referring to FIG. 2, in operation S100, the antenna tuning device may set a configuration for multiple sampling (e.g., a configuration associated with the multiple sampling). The antenna tuning device may set an operation timing of configurations in the antenna tuning device for multiple sampling. For example, the antenna tuning device may set a sampling start time, a sampling period, and a timing of configurations of the RF front-end 200.

In operation S120, the antenna tuning device may perform multiple sampling during a measurement period for which a frequency of a transmission signal is constant or substantially constant, according to the set configuration. For example, tuning control circuit 100, in some example embodiments, is configured to perform multiple sampling on a transmission signal S applied to an antenna ANT and a reception signal R corresponding to the transmission signal S during a measurement period for which a frequency allocated to the transmission signal S is constant or substantially constant (e.g., constant within manufacturing tolerances and/or material tolerances). To perform multiple sampling, the antenna tuning device may obtain ("generate") and store a plurality of instances of sampling data for ('associated with") antenna tuning by ("based on") sampling the transmission signal and a reception signal a plurality of times during the measurement period. As described herein, each instance of sampling data may include data corresponding to the transmission signal S and data corresponding to the reception signal R. In some example embodiments, the measurement period is a period for which ("during which") a frequency allocated to the transmission signal, that is, a frequency of a transmission signal (e.g., RFin of FIG. 1) whose frequency is modulated, is constant. Sampling may be performed at least twice (and thus at least two instances of sampling data may be obtained) during the measurement period.

In operation S130, the antenna tuning device may calculate a parameter for antenna tuning based on data obtained by the multiple sampling (e.g., at least some of the plurality of instances of sampling data). For example, the antenna tuning device may calculate parameters including a reflection coefficient and a VSWR.

In operation S140, the antenna tuning device may set a tuning value based on the calculated parameter. In some example embodiments, the antenna tuning device may set a tuning value by referring to a look-up table including a tuning value corresponding to each of a plurality of parameter values, based on the calculated parameter. The control circuit 100 may include a look-up table configured to store tuning values corresponding to a plurality of parameter values. The associations between tuning values and parameter values in the look-up table may be determined via known empirical techniques, for example wherein a set of parameter values may be determined to correspond to known, measured tuning values, or conversely a set of tuning values may be determined to correspond to known, measured parameter values. In some example embodiments, the antenna tuning device may derive a minimum parameter value based on a plurality of calculated parameter values, and may set a tuning value corresponding to the minimum parameter value.

In operation S150, the antenna tuning device may apply the tuning value to the antenna tuner 300 (see FIG. 1). The antenna tuning device may generate the tuning control signal TCS corresponding to the tuning value and may apply the tuning control signal TCS to the antenna tuner 300. Accordingly, an antenna may be tuned by adjusting an internal impedance.

Figure 3:
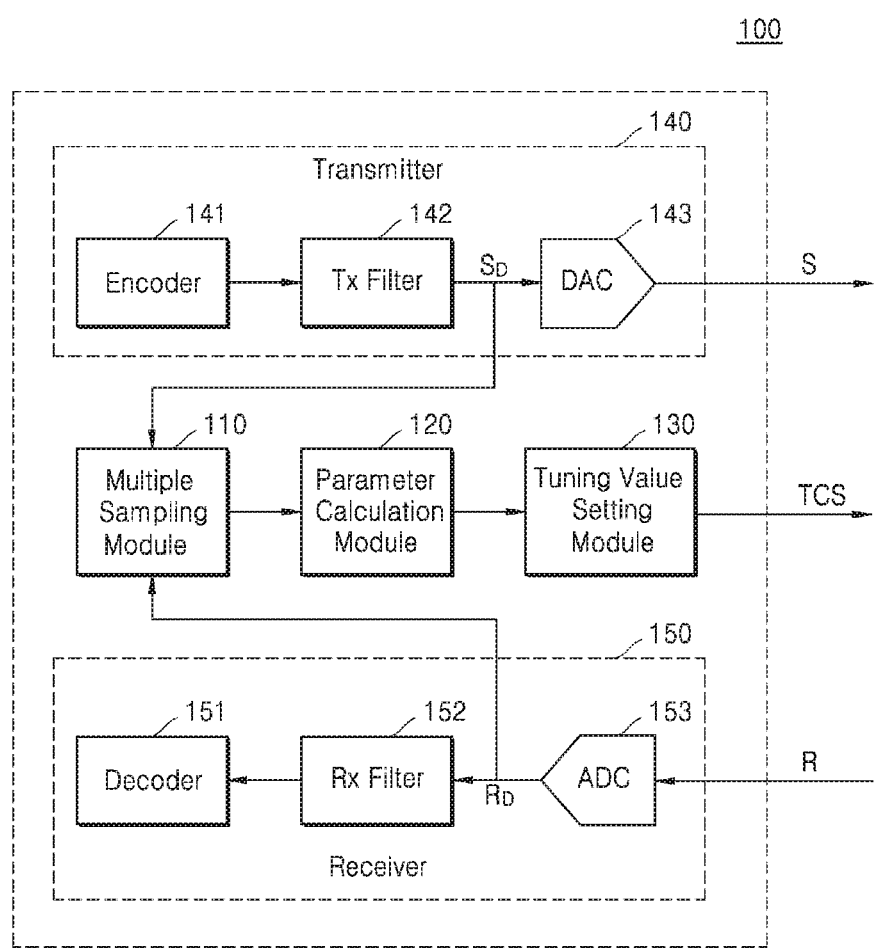
FIG. 3 is a block diagram of a control circuit of FIG. 1 according to some example embodiments.

FIG. 3 is a block diagram of the control circuit 100 of FIG. 1 according to some example embodiments.

Referring to FIG. 1, the control circuit 100 may include the multiple sampling module 110, a parameter calculation module 120, a tuning value setting module 130, a transmitter 140, and a receiver 150. In some example embodiments, the control circuit 100 may be an element included in a modem. Similarly to the multiple sample module 110 as described above, any of the elements of the control circuit 100 as illustrated in FIG. 3 may include and/or may be implemented by one or more instances of hardware (e.g., electronic circuitry) of the control circuit 100.

The transmitter 140 may include an encoder 141, a transmission filter 142, and a digital-to-analog converter 143. The encoder 141 may encode received data according to a set ("particular") encoding method and may output encoded data. The encoded data may be filtered based on a specific frequency band by the transmission filter 142 and may be output as transmission data $S_D$ (or digital transmission data). The digital-to-analog converter 143 may convert the transmission data $S_D$ into an analog signal and may output the analog signal as the transmission signal S.

The receiver 150 may include a decoder 151, a reception filter 152, and an analog-to-digital converter 153. The analog-to-digital converter 153 may convert the reception signal R into an analog signal and may output the analog signal as reception data $R_D$ (also called a digital reception signal). The reception data $R_D$ may be filtered based on a specific frequency band by the reception filter 152 and may be output. The decoder 151 may decode the reception signal, that is, a digital reception signal, output through the reception filter 152 according to a set decoding method and may output decoded data.

The multiple sampling module 110 may receive and store the transmission data $S_D$ a plurality of times from the transmitter 140 and may receive and store the reception data $R_D$ a plurality of times from the receiver 150 within a measurement period. Accordingly, the multiple sampling module 110 may perform multiple sampling on the transmission signal S and the reception signal R within the measurement period and may obtain data ("sampling data") according to the multiple sampling. In some example embodiments, an individual instance of generated sampling data may include an individual instance of received transmission data $S_D$ and an individual instance of received reception data $R_D$, where the data included in a given instance of sampling data may be received simultaneously or substantially simultaneously (e.g., within a particular time interval) at the multiple sampling module 110.

The parameter calculation module 120 may calculate a parameter for antenna tuning based on the data obtained according to the multiple sampling (e.g., the sampling data). In some example embodiments, the parameter calculation module 120 may compensate for a phase and/or a magnitude of the calculated parameter.

The tuning value setting module 130 may set a tuning value based on the calculated parameter and may output the tuning control signal TCS according to the set tuning value. In some example embodiments, the tuning value setting module 130 may include a look-up table including a tuning value corresponding to each of a plurality of parameter values.

At least one module from among the multiple sampling module 110, the parameter calculation module 120, and the tuning value setting module 130 may be implemented as hardware, software, firmware, or a combination thereof. In some example embodiments, the parameter calculation module 120 and the tuning value setting module 130 may be implemented as program code, may be stored in a memory, and may be executed by a processor (e.g., a microprocessor of the modem or an application processor of an electronic device).

Figure 4:
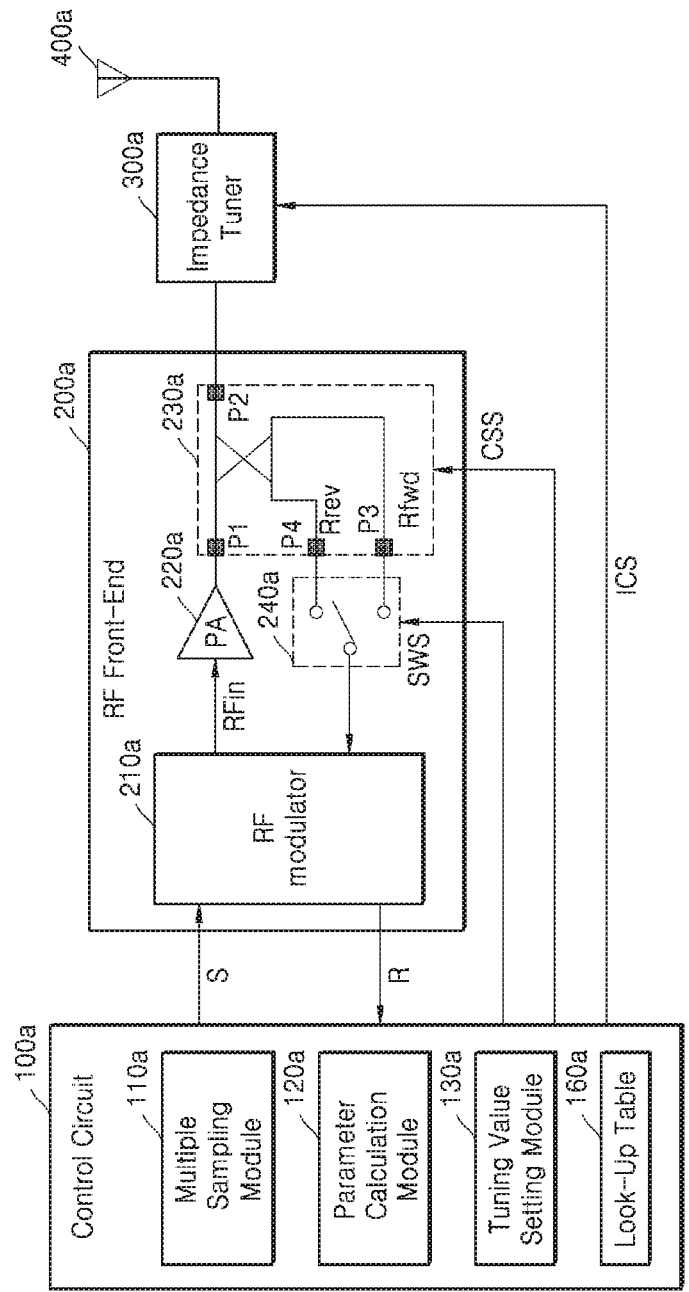
FIG. 4 is a block diagram of an antenna tuning device according to some example embodiments.

FIG. 4 is a block diagram of an antenna tuning device 10a according to some example embodiments. The antenna tuning device 10a of FIG. 4 may tune an antenna by compensating an impedance mismatch of the antenna based on a reflection coefficient.

Referring to FIG. 4, the antenna tuning device 10a may include a control circuit 100a, an RF front-end 200a, and an impedance tuner 300a.

The impedance tuner 300a may include a capacitor and an inductor, and a capacity of the capacitor may vary according to an applied voltage. At least one from among a magnitude and a phase of an impedance may be changed when ("based on") a voltage applied to the impedance tuner 300a is changed based on an impedance control signal ICS. As described herein, an impedance control signal ICS may also be called an "antenna impedance control signal."

The RF front-end 200a may include an RF modulator 210a, a power amplifier 220a, a bidirectional coupler 230a, and a switch 240a. A configuration of the RF front-end 200a may be similar to that of the RF front-end 200 of FIG. 1 except that the RF front-end 200a includes the bidirectional coupler 230a as a directional coupler and further includes the switch 240a.

The bidirectional coupler 230a may be connected between the power amplifier 220a and the impedance tuner 300a and may output a signal applied to the antenna 400a or a signal received from the antenna 400a. The bidirectional coupler 230a may output a received signal through a port according to a set direction. For example, when a forward direction is set, the bidirectional coupler 230a may output a signal input through a first port P1 as a forward reception signal through a third port P3. Also, when a reverse direction is set, the bidirectional coupler 230a may output a signal reflected from the antenna ANT as a reverse reception signal through a fourth port P4. A direction of the bidirectional coupler 230a may be set according to a coupler setting signal CSS applied from the control circuit 100a.

The switch 240a may apply signals output through the third port P3 and the fourth port P4 of the bidirectional coupler 230a, for example, the forward reception signal and the reverse reception signal, to the RF modulator 210a. In some example embodiments, the switch 240a may alternately apply the forward reception signal and the reverse reception signal to the RF modulator 210a according to a switch signal SWS. The switch signal SWS may be applied from the control circuit 100a and may be synchronized with the coupler setting signal CSS.

The RF modulator 210a may down-convert the forward reception signal and the reverse reception signal applied through the switch 240a and may apply the down-converted signals to the control circuit 100a. Operations of the RF modulator 210a and the power amplifier 220a have already been described with reference to FIG. 1, and thus a repeated explanation thereof will not be given.

The control circuit 100a may include a multiple sampling module 110a, a parameter calculation module 120a, a tuning value setting module 130a, and a look-up table 160a. Also, the antenna tuning device 10a may further include other elements (e.g., the transmitter 140 and the receiver 150 of FIG. 3). A configuration and an operation of the control circuit 100a are similar to those of the control circuit 100 of FIG. 3, and thus the description made with reference to FIG. 3 may apply to the control circuit 100a of some example embodiments.

The multiple sampling module 110a may sample the transmission signal S and the reception signal R at least twice within a measurement period for which a frequency to which the transmission signal S is allocated, in other words, a frequency of the RF transmission signal RFin, is constant.

For example, the multiple sampling module 110a controls the bidirectional coupler 230a so that a direction of the bidirectional coupler 230a is changed at least once within the measurement period, thus the plurality of sampling data generated during the multiple sampling may include at least two separate instances of sampling data generated when the bidirectional coupler 230a is set to different directions during the measurement period. Restated, performing multiple sampling may include changing a direction of the bidirectional coupler 230a during the measurement period, where the bidirectional coupler 230a is associated with applying the transmission signal S to the antenna ANT according to the setting of the configuration, where the changing the direction of the bidirectional coupler 230a during the measurement period includes setting the direction of the bidirectional coupler 230a to a forward direction prior to performing the first sampling and setting the direction of the bidirectional coupler 230a to a reverse direction subsequent to performing the first sampling and prior to performing the second sampling. The multiple sampling module 110a may sample the transmission signal S and the reception signal R when the bidirectional coupler 230a is set to a forward direction, which may be referred to as first sampling (e.g., generating at least one first instance of sampling data). Next, the multiple sampling module 110a may sample the transmission signal S and the reception signal R when the bidirectional coupler 230a is set to a reverse direction, which may be referred to as second sampling (e.g., generating at least one second instance of sampling data). Accordingly, the multiple sampling module 110a may perform sampling at least twice within the measurement period.

The parameter calculation module 120a may calculate a reflection coefficient based on data (e.g., the plurality of sampling data) obtained through the sampling that is performed at least twice. Restated, the parameter calculation module 120a may calculate a reflection coefficient based on first sampling data obtained in a first sampling and second sampling data obtained in a second sampling. The parameter calculation module 120a may calculate a reflection coefficient by calculating a correlation between the transmission signal S and the reception signal R.

Also, the parameter calculation module 120a may compensate for a magnitude and/or a phase of the calculated reflection coefficient to generate a compensated reflection coefficient based on a reference frequency. Restated, the parameter calculation module 120a may compensate for at least one from among a magnitude and a phase of the reflection coefficient based on a reference frequency. As described above, a frequency to which the transmission signal S is allocated may be continuously changed according to a communication method, and a magnitude and a phase of the reflection coefficient may be changed according to the frequency. Accordingly, the calculated reflection coefficient may be compensated based on the reference frequency, for example, a frequency of the look-up table 160a.

The tuning value setting module 130a may set a tuning value based on the reflection coefficient applied from the parameter calculation module 120a, and may generate the impedance control signal ICS according to (e.g., "corresponding to") the tuning value. The tuning value setting module 130a may set a tuning value by referring to the look-up table 160a based on the reflection coefficient.

The look-up table 160a may include a tuning value corresponding to each of various values of the reflection coefficient, that is, an impedance tuning value. A tuning value may be a set value for adjusting an impedance of the antenna 400a so that the reflection coefficient has a reflection coefficient value of a maximum matching state based on a reflection coefficient value corresponding to the tuning value. A tuning value corresponding to each of values of the reflection coefficient measured under various conditions of an impedance at the reference frequency may be previously calculated and may be stored in the look-up table 160a. In some example embodiments, the reference frequency may be a center frequency of a frequency range in which an impedance tuning value is relatively constant.

The tuning value setting module 130a may search the look-up table 160a based on the reflection coefficient. The tuning value setting module 130a may set a tuning value by selecting a tuning value corresponding to the reflection coefficient in the look-up table 160a.

Figure 5:
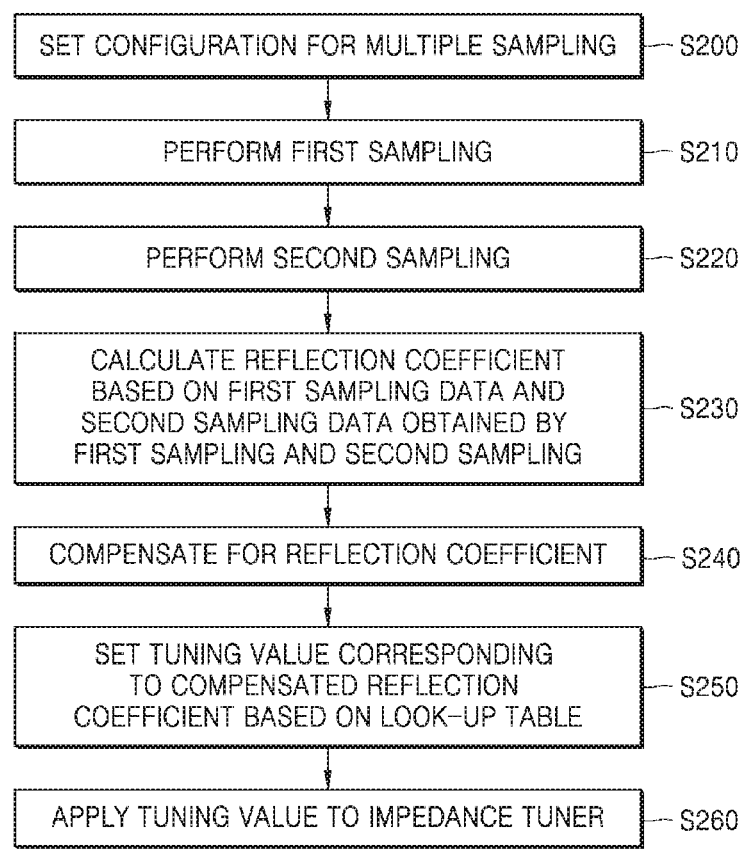
FIG. 5 is a flowchart of an impedance tuning method according to some example embodiments.

FIG. 5 is a flowchart of an impedance tuning method according to some example embodiments. The impedance tuning method of FIG. 5 may be performed by the antenna tuning device 10a of FIG. 4, and the description made with reference to FIG. 4 may apply to the impedance tuning method of FIG. 5.

Referring to FIGS. 4 and 5, in operation S200, the control circuit 100a may set a configuration for multiple sampling. The control circuit 100a may set an operation timing of configurations in the antenna tuning device 10a to perform multiple sampling. For example, at least two sampling start times, a sampling period, and a time when a value of the coupler setting signal CSS or the switch signal SWS is changed may be set.

In operations S210 and S220, the multiple sampling module 110a may perform sampling at least twice during a measurement period for which a frequency is constant according to the set configuration. The transmission signal S may include a first transmission signal and a second transmission signal that are sequentially applied to the antenna 400a during the measurement period. In operation S210, the multiple sampling module 110a may perform first sampling by sampling both the first transmission signal and a first reception signal, where the first reception signal corresponds to a return signal of the first transmission signal, for example, a forward reception signal. Due to the first sampling, first sampling data including sampling data of the first transmission signal and sampling data of the forward reception signal may be obtained. Restated, the multiple sampling module 110a may, in operation S210, generate first sampling data based on sampling a forward reception signal corresponding to a transmission signal allocated to a first frequency applied to an antenna.

In operation S220, the multiple sampling module 110a may perform second sampling by sampling both a second transmission signal and a second reception signal, where the second reception signal corresponds to a reflection signal output when the second transmission signal is reflected from the antenna 400a, for example, a reverse reception signal. Due to the second sampling, second sampling data including sampling data of the second transmission signal and sampling data of the reverse reception signal may be obtained. Restated, the multiple sampling module 110a may, in operation S220, generate second sampling data based on sampling a reverse reception signal corresponding to a reflection signal of the transmission signal.

Although the forward reception signal is sampled and then the reverse reception signal is sampled in FIG. 5, embodiments are not limited thereto and the reverse reception signal may be sampled and then the forward reception signal may be sampled. In other words, operation S220 may be performed before operation S210.

In operation S230, the parameter calculation module 120a may calculate a reflection coefficient based on the first sampling data and the second sampling data obtained by the first sampling and the second sampling. Each of the first sampling data and the second sampling data may include sampling data of the transmission signal and the reception signal. Restated, the multiple sampling module 110a may, in operation S230, calculate a reflection coefficient based on the first sampling data and the second sampling data.

In operation S240, the parameter calculation module 120a may compensate for the reflection coefficient. The parameter calculation module 120a may compensate for the reflection coefficient based on a frequency difference between a frequency of the transmission signal and a frequency of the look-up table 160a, that is, a reference frequency. Restated, the multiple sampling module 110a may, in operation S240, compensate for the reflection coefficient to generate a compensated reflection coefficient based on a reference frequency. The reference frequency may be understood to be related to a look-up table 160a comprising tuning values corresponding to a plurality of reflection coefficient values, such that the setting of the tuning value includes selecting a tuning value corresponding to the reflection coefficient in the look-up table 160a. As described further below with reference to at least FIGS. 10-12, the compensating of the reflection coefficient (e.g., generating of a compensated reflection coefficient) may include compensating for a phase of the reflection coefficient to generate a compensated reflection coefficient based on a unit phase compensation value that is previously set ("previously measured"), and a phase compensation value that is calculated based on a frequency offset between the reference frequency and the first frequency applied to the antenna. As described further below with reference to at least FIGS. 10-12, the compensating of the reflection coefficient may include compensating based on an origin on a complex plane, and compensating based on a central value of reflection coefficients included in a look-up table. For example, the parameter calculation module 120a may compensate for a phase of the parameter based on a frequency offset between a frequency of the look-up table 160a and the frequency allocated to the transmission signal S.

In operation S250, the tuning value setting module 130a may set a tuning value corresponding to the compensated reflection coefficient based on the look-up table 160a, and in operation S260, may apply the tuning value to the impedance tuner 300a. The tuning value setting module 130a may generate the impedance control signal ICS corresponding to the tuning value, and may apply the impedance control signal ICS to the impedance tuner 300a to induce adjustment of an impedance of the antenna ANT based on the impedance control signal ICS. The impedance tuner 300a may therefore compensate for an impedance mismatch by changing an internal capacitance or inductance based on the impedance control signal ICS. Restated, the multiple sampling module 110a may, in operation S250, set a tuning value associated with compensating for an impedance mismatch of the antenna based on the reflection coefficient.

Figure 6:
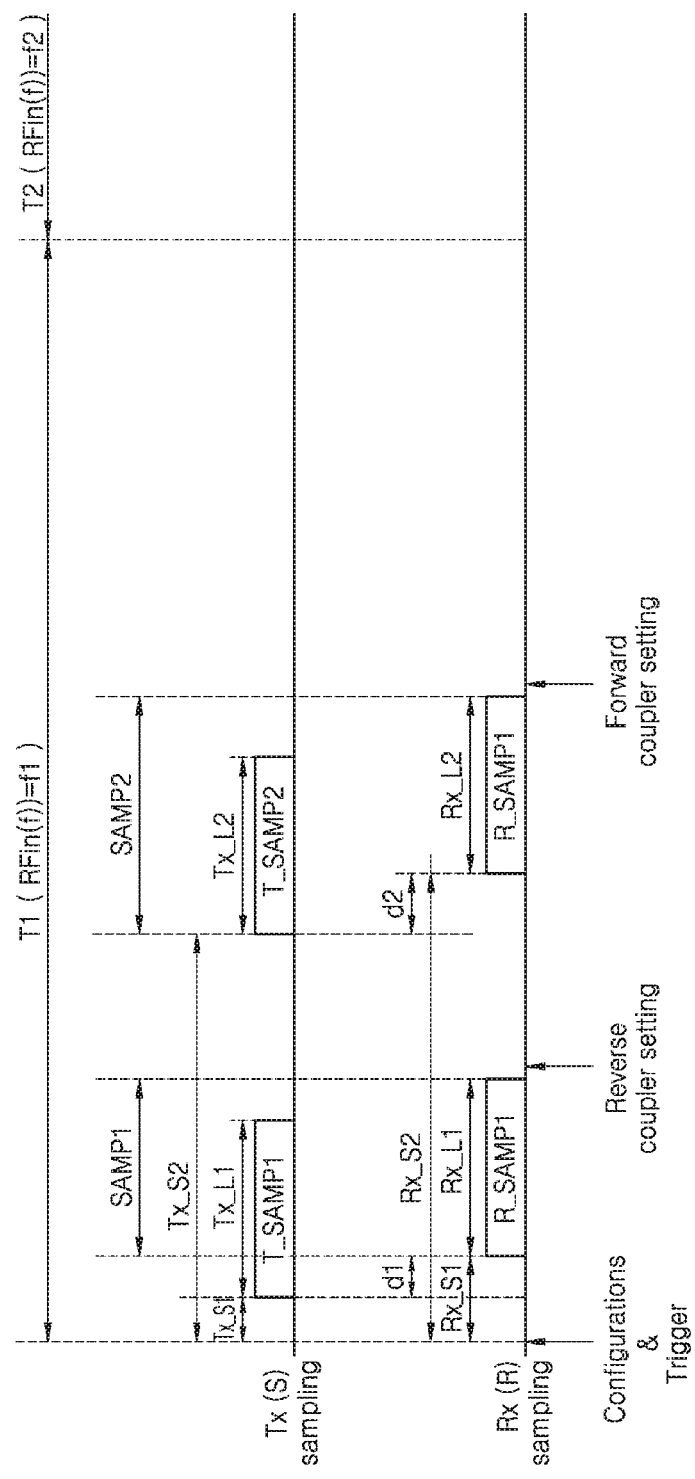
FIG. 6 illustrates multiple sampling according to some example embodiments.

FIG. 6 illustrates multiple sampling according to some example embodiments. The multiple sampling of FIG. 6 may be performed by the antenna tuning device 10a of FIG. 4.

Referring to FIGS. 6 and 4, at least two sampling operations may be performed during a measurement period, for example, a first period T1. As described herein, each sampling operation may result in generation of a separate instance of sampling data. Although two sampling operations, for example, first sampling SAMP1 and second sampling SAMP2, are performed in FIG. 6, embodiments are not limited thereto and an even number of sampling operations may be performed during the first period T1. A frequency RFin(f) of a modulated transmission signal may be constant during the first period T1. For example, the frequency RFin(f) of the modulated transmission signal may be set to a first frequency f1 during the first period T1. Next, the frequency RFin(f) of the modulated transmission signal may be set to a second frequency f2 during a second period T2. The first period T1 may correspond to, for example, one slot.

Configurations for multiple sampling may be set before the first period T1 starts. Sampling delay times (e.g., Tx_S1, Rx_S1, Tx_S2, and Rx_S2), sampling lengths (e.g., Tx_L1, Rx_L1, Tx_L2, and Rx_L2), and a time when a direction of the bidirectional coupler 230a is changed may be set. In some example embodiments, values of the configurations may be stored in a register, and the configurations may be set according to register values during antenna tuning.

When a triggering signal is applied, the transmission signal S and the reception signal R may be sampled according to the set configurations. When the bidirectional coupler 230a is initially set to a forward direction and the first sampling SAMP1 is performed, a first transmission signal and a forward reception signal may be sampled. Next, when the bidirectional coupler 230a is changed to a reverse signal and the second sampling SAMP2 is performed, a second transmission signal and a reverse reception signal may be sampled. However, embodiments are not limited thereto, and the bidirectional coupler 230a may be set to a reverse direction when the first sampling SAMP1 is performed, and then the bidirectional coupler 230a may be set to a forward direction when the second sampling SAMP2 is performed. A difference d1 of a sampling delay time between the transmission signal and the reception signal during the first sampling SAMP1 and a difference d2 of a sampling delay time between the transmission signal and the reception signal during the second sampling SAMP2 may be set to be the same or different from each other.

A method of calculating a parameter and a method of compensating for a parameter will now be explained with reference to FIGS. 7 through 11B.

Figure 7:
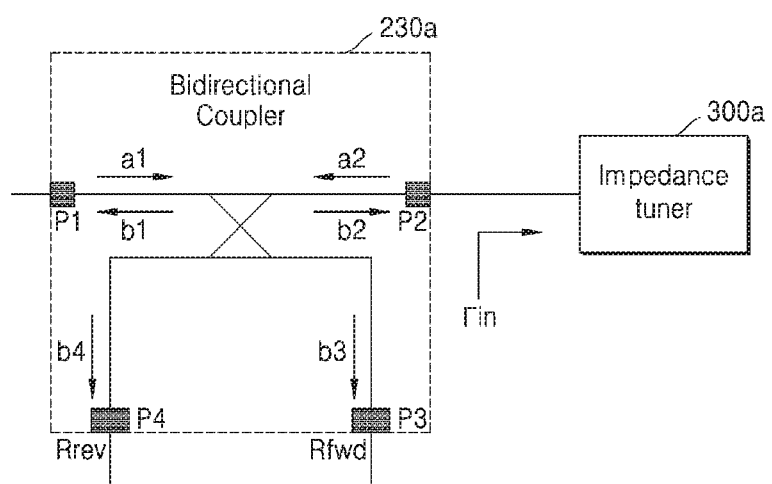
FIG. 7 is a view for explaining signals transmitted through a bidirectional coupler of FIG. 4.

FIG. 7 is a view for explaining signals transmitted through the bidirectional coupler 230a of FIG. 4.

Referring to FIG. 7, the bidirectional coupler 230a may include a 4-port network, and may include the first through fourth ports P1 through P4. b1 through b4 denote output signals output through the first through fourth ports P1 through P4, and a1 and a2 denote input signals input to the first port P1 and the second port P2.

The impedance tuner 300a may be connected to the second port P2. An RF transmission signal may be received through the first port P1, and may be output to the impedance tuner 300a through the second port P2. A return signal of the RF transmission signal may be output as a forward reception signal Rfwd through the third port P3, and a reflection signal of the RF transmission signal may be output as a reverse reception signal Rrev through the fourth port P4.

The 4-port network may be expressed by using an S-parameter as shown in Equation 1.

$$\begin{pmatrix} b_1 \\ b_2 \\ b_3 \\ b_4 \end{pmatrix} = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} \begin{pmatrix} a_1 \\ b_2 \Gamma_{in} \\ 0 \\ 0 \end{pmatrix} \quad (1)$$

where $\Gamma_{in}$ is a reflection coefficient of an antenna.

When it is assumed that cross-talk of the bidirectional coupler 230a is small, $S_{41} \approx 0$ and $S_{32} \approx 0$, and when it is assumed that the bidirectional coupler 230a has a symmetric structure, $S_{31} = S_{42}$. Accordingly, $b_3$ and $b_4$ may be approximated as shown in Equation 2.

$$b_3 = S_{31}a_1 + S_{32}b_2\Gamma_{in} \approx S_{31}a_1$$

$$b_4 = S_{41}a_1 + S_{42}b_2\Gamma_{in} \approx S_{42}S_{21}a_{11}\Gamma_{in} \quad (2).$$

Accordingly, the reflection coefficient $\Gamma_{in}$ may be approximated as shown in Equation 3.

$$\Gamma_{in} = \frac{s_{31}b_4}{s_{42}s_{21}b_3} \approx \frac{b_4}{s_{21}b_3}. \quad (3)$$

$b_4/b_3$ may be obtained from Equation 3 and may be defined by Equation 4.

$$\frac{b_4}{b_3} \approx S_{21}\Gamma_{in}. \quad (4)$$

When a carrier frequency is the same, $S_{21}$ is constant, and thus the reflection coefficient $\Gamma_{in}$ may be estimated based on Equation 4. $b_4/b_3$ is a similar reflection coefficient. The similar reflection coefficient may be calculated based on data obtained according to multiple sampling. As shown in Equation 5, the similar reflection coefficient may be calculated according to a ratio of maximum values of correlations between the transmission signal S and the reception signal R.

$$\frac{b_4}{b_3} = \frac{P_{fwd}}{P_{rev}} \cdot \frac{(S_{rev} \otimes R_{rev})(\tau_{revmax} + \tau_{revoff})}{(S_{fwd} \otimes R_{fwd})(\tau_{fwdmax} + \tau_{fwdoff})} \cdot \quad (5)$$

$$\exp(j2\pi \cdot (f_{revoff} \cdot \tau_{revoff} - f_{fwdoff} \cdot \tau_{fwdoff})).$$

For example, where multiple sampling includes 1) performing first sampling on both the first transmission signal and a first reception signal, the first reception signal corresponding to a return signal of the first transmission signal, and 2) performing second sampling on both the second transmission signal and a second reception signal, the second reception signal corresponding to a reflection signal of the second transmission signal, the reflection coefficient may be calculated based on a ratio between 1) a maximum value of a correlation between the first transmission signal and the first reception signal, as described herein, and 2) a maximum value of a correlation between the second transmission signal and the second reception signal, as also described herein.

In some example embodiments, $P_{fwd}$ and $P_{rev}$ denote power of the transmission signal S when the bidirectional coupler 230a is set to a forward direction and a reverse direction. $S_{fwd}$ and $S_{rev}$ denote the transmission signal S when the bidirectional coupler 230a is set to a forward direction and a reverse direction, and $R_{fwd}$ and $R_{rev}$ respectively denote a forward reception signal and a reverse reception signal. A correlation may be defined by Equation 6, and is obvious to one of ordinary skill in the art.

$$(S \otimes R)(\tau) \triangleq \int_{-\infty}^{\infty} S^*(t) \cdot R(t+\tau) dt \quad (6).$$

$f_{revoff}$ and $f_{fwdoff}$ denote offsets between frequencies allocated to the transmission signal S, in other words, offsets between a sub-carrier frequency and a carrier frequency, when the bidirectional coupler 230a is set to a forward direction and a reverse direction. $\tau_{fwdoff}$ and $\tau_{revoff}$ denote residual delay offsets between the transmission signal S and the reception signal R when the bidirectional coupler 230a is set to a forward direction and a reverse direction, and denote offsets at delay values $\tau_{revmax}$ and $\tau_{fwdmax}$ having maximum correlations. The residual delay offsets may occur due to a parasitic component of hardware.

Figure 8A:
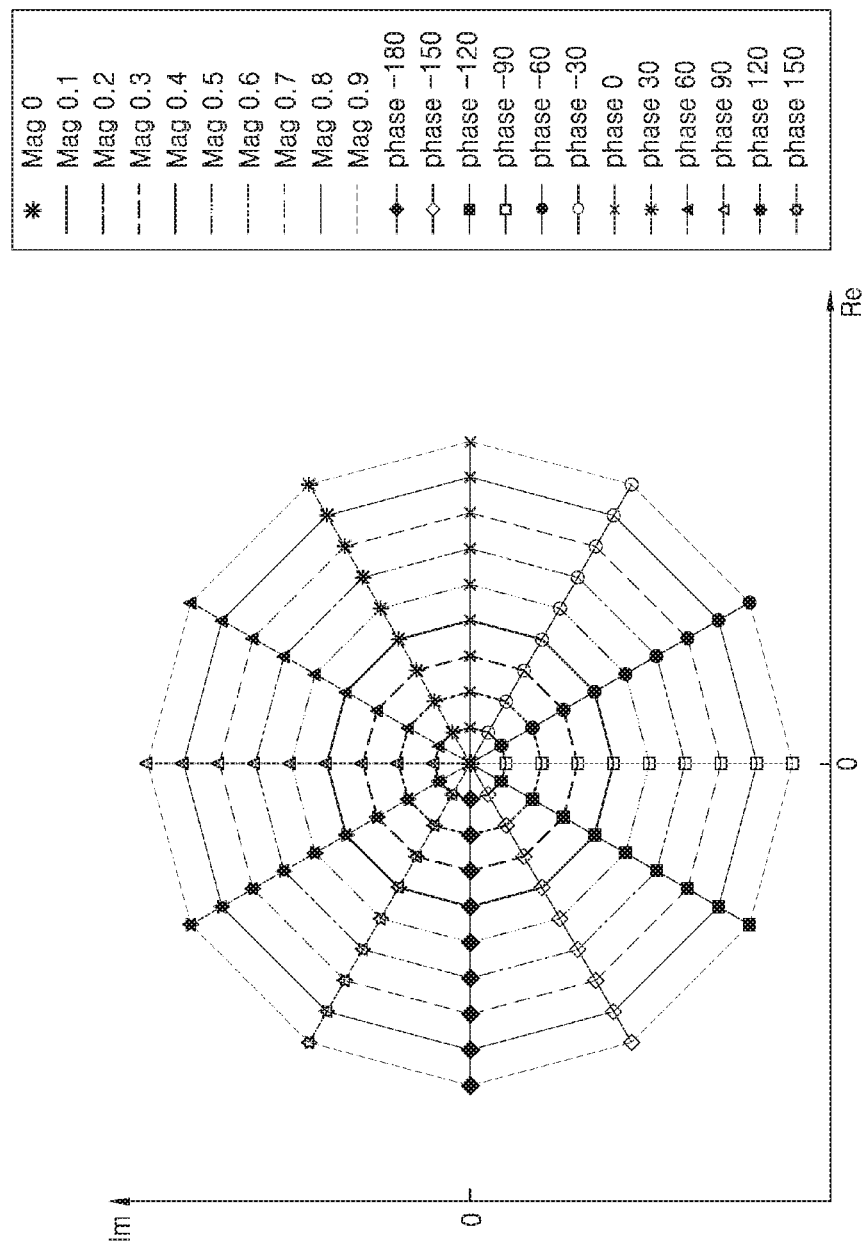
FIG. 8A is a graph illustrating a desired reflection coefficient of a load impedance applied to an antenna according to some example embodiments.
Figure 8B:
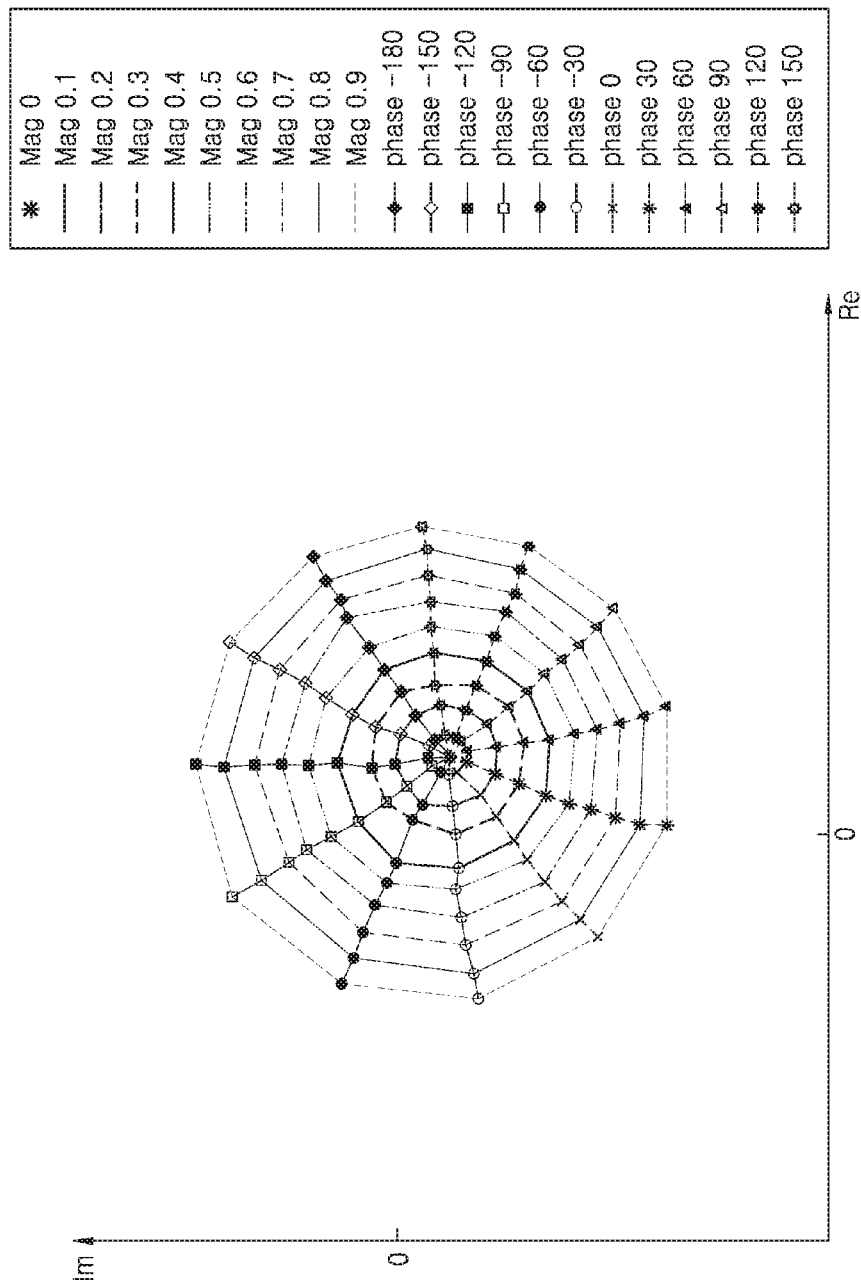
FIG. 8B is a graph illustrating similar reflection coefficients respectively corresponding to desired reflection coefficients according to some example embodiments.

FIG. 8A is a graph illustrating a desired reflection coefficient of a load impedance applied to an antenna. FIG. 8B is a graph illustrating similar reflection coefficients respectively corresponding to desired reflection coefficients. FIGS. 8A and 8B illustrate desired reflection coefficients and similar reflection coefficients on a complex plane.

FIG. 8A illustrates a desired reflection coefficient under a condition that does not consider a parasitic component of hardware of the antenna tuning device 10a (see FIG. 4). Accordingly, the desired reflection coefficient may have the same magnitude and phase as those of a load impedance.

Referring to FIG. 8B, a similar reflection coefficient has a distribution similar to that of the desired reflection coefficient of FIG. 8A. Accordingly, the similar reflection coefficient may be referred to as a reflection coefficient or a measured reflection coefficient. However, since the similar reflection coefficient is a value measured when a load impedance of an antenna is changed in a step of manufacturing the antenna tuning device 10a (see FIG. 4) or an initial setting step, the similar reflection coefficient reflects a parasitic component of hardware of the antenna tuning device 10a. Accordingly, a magnitude and a phase of the similar reflection coefficient are different from those of the desired reflection coefficient, and a central point of the similar reflection coefficient may have a value biased from the origin (0, 0).

Since the similar reflection coefficient has a distribution similar to the desired reflection coefficient, the antenna tuning device 10a may previously store similar reflection coefficients and tuning values of the similar reflection coefficients in the look-up table 160a (see FIG. 4), and may use the similar reflection coefficients and the tuning values during antenna tuning. The tuning value setting module 130a (see FIG. 4) may select a similar reflection coefficient closest to a similar reflection coefficient calculated in real time in the look-up table 160a, and may set a tuning value corresponding to the selected similar reflection coefficient as an optimal tuning value for compensating for an impedance mismatch.

However, as described above, a magnitude and a phase of a reflection coefficient may vary according to a frequency. Hence, a method of compensating for an impedance mismatch may be performed when a frequency of a similar reflection coefficient calculated in real time, that is, a frequency of a measured reflection coefficient, is the same as frequencies of reflection coefficients in the look-up table 160a.

Figure 9:
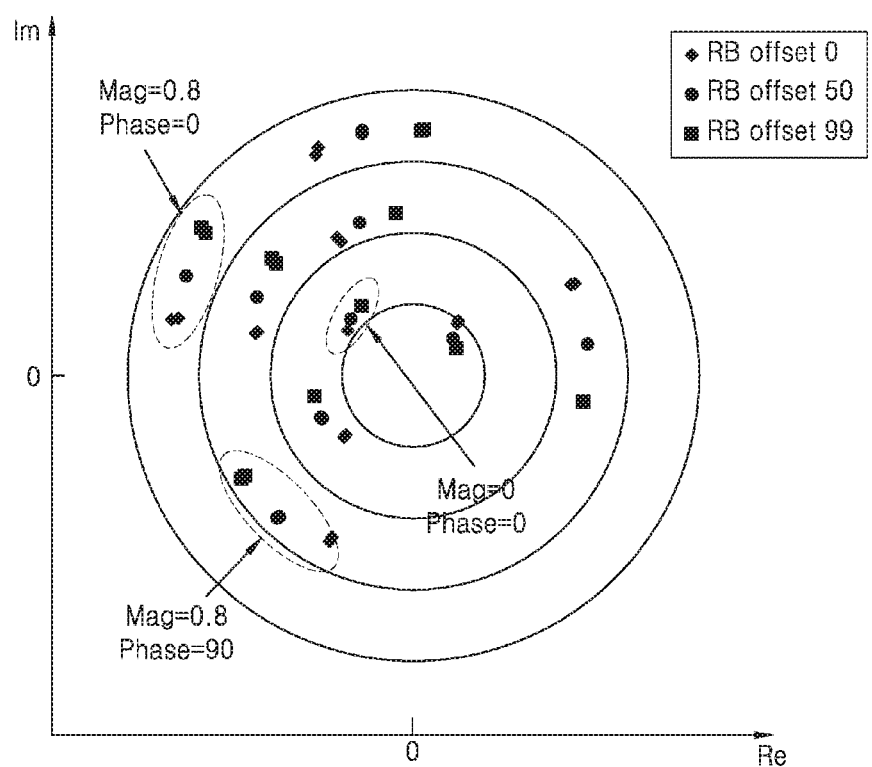
FIG. 9 is a graph illustrating a change in a similar reflection coefficient according to a frequency according to some example embodiments.

FIG. 9 is a graph illustrating a change in a similar reflection coefficient according to a frequency.

In FIG. 9, a resource block (RB) offset refers to a relative position in a bandwidth of a frequency to which a resource block is allocated. When the communication bandwidth is divided into 100 parts according to same frequencies, the RB offset is an index indicating a position of each frequency range. For a carrier frequency, the RB offset may be allocated to 50. Similar reflection coefficients of FIG. 9 are obtained by setting a magnitude of a reflection coefficient of a load impedance of an antenna to 0, 0.4, and 0.8 for the RB offset, setting a phase of the reflection coefficient to 00, 90°, 180°, and 270°, and then measuring the similar reflection coefficients to correspond to desired reflection coefficients.

Referring to FIG. 9, it is found that a phase of a similar reflection coefficient when a frequency allocated to a transmission signal S is located on either edge of the communication bandwidth (e.g., the RB offset is 0 or 99) is rotated about a central point of a similar reflection coefficient when a frequency allocated to the transmission signal S is a carrier frequency (e.g., the RB offset is 50).

As such, since a similar reflection coefficient varies according to a frequency, in order to accurately compare similar reflection coefficients, similar reflection coefficients for all frequencies and tuning values corresponding to the similar reflection coefficients may be stored in a look-up table. However, generating and storing a look-up table for all frequencies requires an extremely large memory space and thus may be difficult.

Accordingly, the antenna tuning device 10a (see FIG. 4) according to some example embodiments may store the look-up table 160a (see FIG. 4) generated at a reference frequency of a frequency range in which a tuning value is relatively constant and may use the look-up table 160a during impedance tuning of an antenna. The parameter calculation module 120a (see FIG. 4) may obtain an improved and/or optimal tuning value by compensating for a reflection coefficient calculated in real time based on the reference frequency and setting a tuning value by referring to the look-up table 160a based on the compensated reflection coefficient. Restated, the parameter calculation module 120a may select a tuning value corresponding to the compensated reflection coefficient in a look-up table 160a generated based on the reference frequency.

When the forward reception signal Rfwd and the reverse reception signal Rrev are sampled at different frequencies to calculate a reflection coefficient, the calculated reflection coefficient may fail to accurately reflect a change in a magnitude and a phase of the reflection coefficient when a frequency is changed, thereby making it difficult to compensate for the reflection coefficient based on a reference frequency. Accordingly, the antenna tuning device 10a according to some example embodiments samples the forward reception signal Rfwd and the reverse reception signal Rrev at the same frequency through multiple sampling as described above, so as for a reflection coefficient to reflect a change in a magnitude and a phase according to a frequency offset.

Furthermore, the antenna tuning device 10a according to some example embodiments may also compensate for a phase error due to a residual delay offset through multiple sampling. Referring to Equation 5, when residual delay offsets $\tau_{revmax}$ and $\tau_{fwdmax}$ exist between the transmission signal S and the reception signal R, a phase shift (see an exponential term of Equation 5) occurs by multiplications of frequency offsets $f_{revoff}$ and $f_{fwdoff}$. A reflection coefficient may be rotated by the phase shift about the origin (0, 0) on a complex plane. For the purpose of compensation, the residual delay offsets $\tau_{revmax}$ and $\tau_{fwdmax}$ have to be accurately measured. However, it is not easy to accurately measure the residual delay offsets $\tau_{revmax}$ and $\tau_{fwdmax}$.

However, when the forward reception signal Rfwd and the reverse reception signal Rrev are sampled at the same frequency according to multiple sampling, since the frequency offsets $f_{revoff}$ and $f_{fwdoff}$ are the same, Equation 5 for calculating a reflection coefficient, that is, a similar reflection coefficient, may be re-written as Equation 7.

$$\frac{b_4}{b_3} = \frac{P_{fwd}}{P_{rev}} \cdot \frac{(S_{rev} \otimes R_{rev})(\tau_{revmax} + \tau_{revoff})}{(S_{fwd} \otimes R_{fwd})(\tau_{fwdmax} + \tau_{fwdoff})} \cdot \quad (7)$$

$$\exp(j2\pi \cdot (f_{off} \cdot (\tau_{revoff} - \tau_{fwdoff}))).$$

Accordingly, the antenna tuning device 10a may calculate a residual delay offset difference per unit frequency, without measuring each of the residual delay offsets $\tau_{revmax}$ and $\tau_{fwdmax}$, or may measure a phase shift value according to an offset frequency $f_{off}$, and may compensate for a phase difference of a reflection coefficient due to a residual delay offset by using the obtained value. The antenna tuning device 10a may previously store the residual delay offset difference or the phase shift value per unit frequency, and may compensate for a phase of the reflection coefficient based on the previously stored value when the reflection coefficient is to be compensated.

Compensation of a phase of a reflection coefficient will now be explained in detail with reference to FIGS. 10 through 12.

Figure 10:
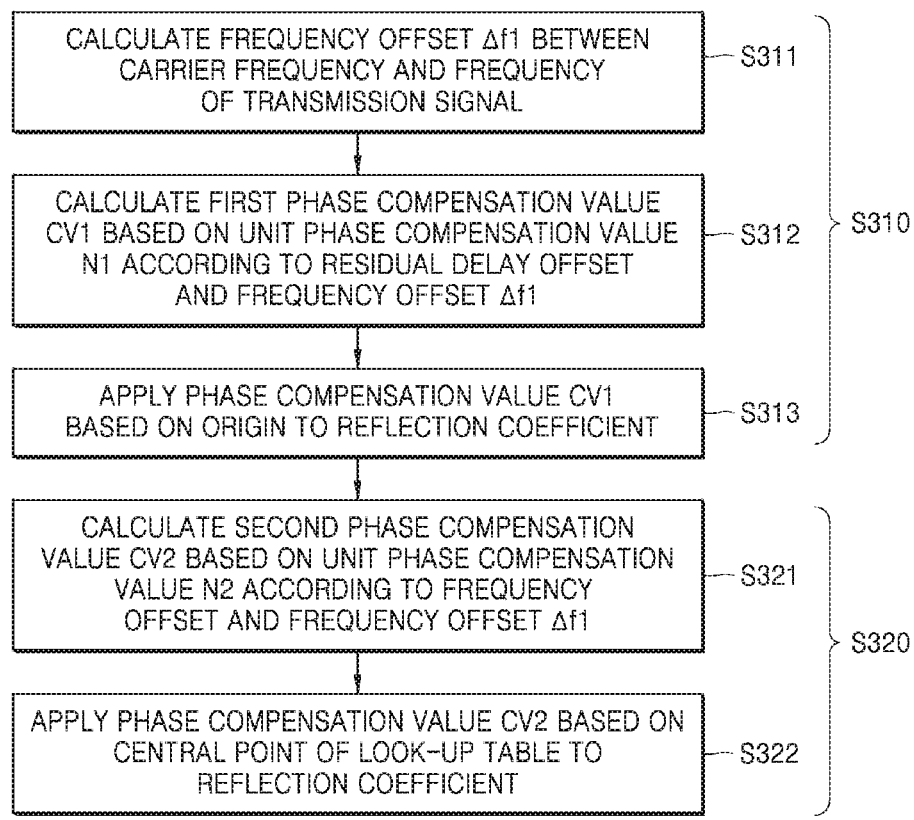
FIG. 10 is a flowchart of a method of compensating for a phase of a reflection coefficient according to some example embodiments.

FIG. 10 is a flowchart of a method of compensating for a phase of a reflection coefficient according to some example embodiments.

Referring to FIG. 10, a method of compensating for a phase of a reflection coefficient may include operation S310 in which a phase difference (also called a phase error) due to a residual delay offset is compensated and operation S320 in which a phase difference ("phase error") according to frequency characteristics of an antenna is compensated. A phase difference of a reflection coefficient in each of operations S310 and S320 is caused by a frequency offset. As described herein a phase error due to a residual delay offset difference between the first reception signal and the second reception signal may be called a "first phase error," and a phase error due to frequency characteristics of the antenna may be called a "second phase error." Thus, a method of compensating for a phase of a reflection coefficient may include operation S310, which may include compensating for a first phase error of the reflection coefficient according to a residual delay offset difference between a first reception signal and a second reception signal, and operation S320, which may include compensating for a second phase error of the reflection coefficient according to frequency characteristics of the antenna.

First, operation S310 in which a phase difference due to a residual delay offset is compensated may be performed. In operation S311, the parameter calculation module 120a (see FIG. 4) of the antenna tuning device 10a (see FIG. 4) may calculate a frequency offset Δf1 (also called a "first frequency offset") between a carrier frequency and a frequency allocated to a transmission signal (during a measurement period, such a frequency may be called a "first frequency"). The parameter calculation module 120a may receive RB offset information before the transmission signal is transmitted, and may calculate the frequency offset Δf1 between the carrier frequency and the frequency to which the transmission signal is allocated based on the RB offset information.

In operation S312, the parameter calculation module 120a may calculate a first phase compensation value CV1 based on the frequency offset Δf1 and a unit phase compensation value N1 that is previously measured and stored. In some example embodiments, the unit phase compensation value N1 that is obtained by normalizing, based on a frequency, a phase value obtained by rotating a central point of the look-up table 160a (see FIG. 4) by the frequency offset Δf1 is a value that measures an influence of the residual delay offset. The central point of the look-up table 160a is a reflection coefficient of a maximum impedance matching state at a reference frequency. The parameter calculation module 120a may calculate a product of the unit phase compensation value N1 and the frequency offset Δf1 as the first phase compensation value CV1. Restated, the parameter calculation module 120a may, in operation S312, calculate a first phase compensation value CV1 based on multiplying a first unit phase compensation value N1 according to the residual delay offset by a first frequency offset Δf1 between a carrier frequency and a first frequency that is allocated to the transmission signal during a measurement period.

In operation S313, the parameter calculation module 120a may apply the first phase compensation value CV1 based on the origin to the reflection coefficient. The parameter calculation module 120a may compensate for a phase difference due to a residual delay offset by rotating a phase of the reflection coefficient by the first phase compensation value CV1 about the origin. Restated, the parameter calculation module 120a may, in operation S313, change the phase of the reflection coefficient by the first phase compensation value CV1 about an origin on a complex plane.

Accordingly, a phase difference due to a residual delay offset may be compensated. Such compensation of a phase difference due to a residual delay offset may be performed in a communication method (e.g., LTE) in which a transmission signal is allocated to a specific frequency region of a communication bandwidth. Also, in a communication method (e.g., 3G) using a full bandwidth, operation S310 in which a phase difference due to a residual delay offset is compensated may be omitted.

Next, operation S320 in which a phase difference according to frequency characteristics of an antenna is compensated may be performed.

In operation S321, the parameter calculation module 120a may calculate a second phase compensation value CV2 based on the frequency offset Δf1 and a unit phase compensation value N2. The unit phase compensation value N2 is a value obtained by normalizing, based on a frequency, a phase value obtained by rotating a phase of the reflection coefficient about the central point of the look-up table 160a due to frequency characteristics of an antenna. The parameter calculation module 120a may calculate a product of the frequency offset Δf1 and the unit phase compensation value N2 as the second phase compensation value CV2. Restated, the parameter calculation module 120a may, in operation S321, calculate a second phase compensation value CV2 based on multiplying a second unit phase compensation value N2 according to the frequency characteristics of the antenna by a first frequency offset Δf1 between a carrier frequency and the first frequency that is allocated to the transmission signal during a measurement period.

In operation S322, the parameter calculation module 120a may apply the second phase compensation value CV2 based on the central point of the look-up table 160a to the reflection coefficient. The parameter calculation module 120a may compensate for a phase difference according to the frequency characteristics of the antenna by rotating a phase of the reflection coefficient by the second phase compensation value CV2 about the central point of the look-up table 160a. Restated, the parameter calculation module 120a may, in operation S321, change the phase of the reflection coefficient by the second phase compensation value CV2 about a central value of reflection coefficient values included in a look-up table 160a.

Figure 11A:
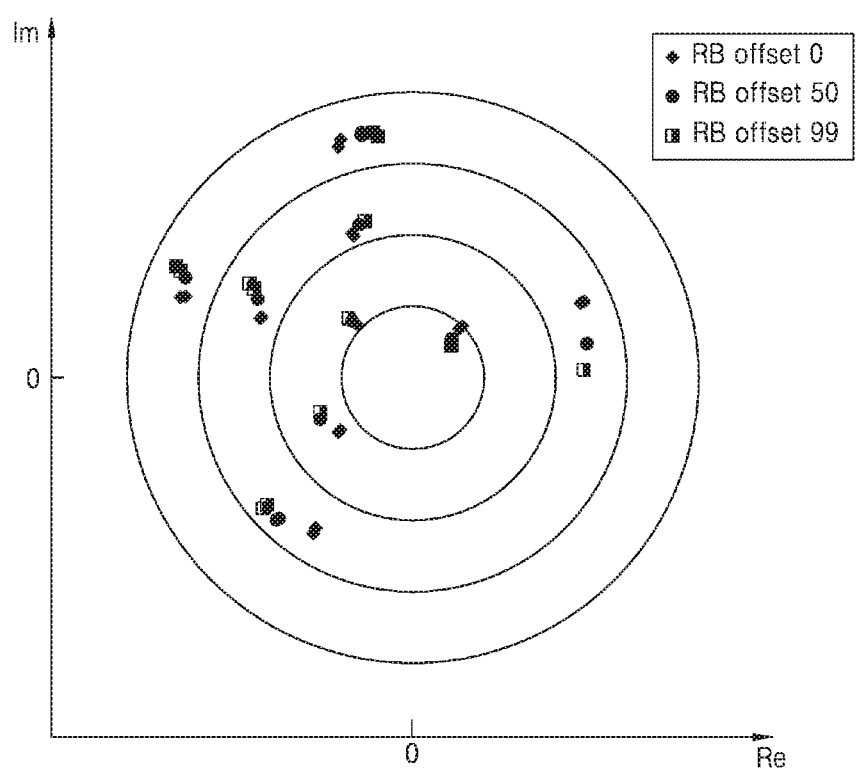
FIG. 11A is a graph illustrating a result obtained after a phase difference due to a residual delay offset is compensated according to some example embodiments.
Figure 11B:
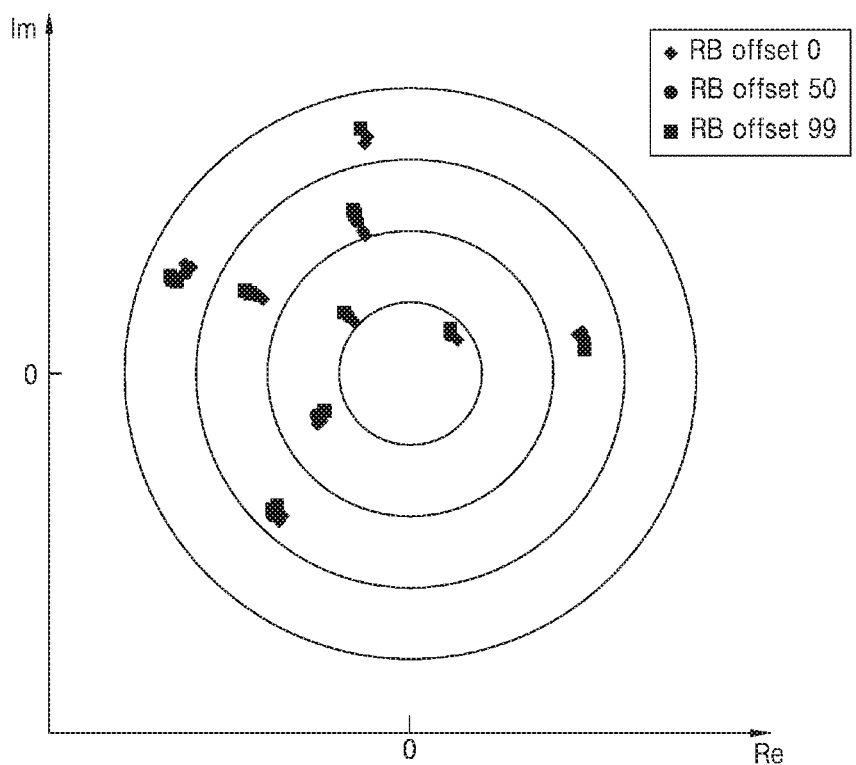
FIG. 11B is a graph illustrating a result obtained after a phase difference according to frequency characteristics of an antenna is compensated according to some example embodiments.

FIG. 11A is a graph illustrating a result obtained after a phase difference due to a residual delay offset is compensated. FIG. 11B is a graph illustrating a result obtained after a phase difference according to frequency characteristics of an antenna is compensated. FIGS. 11A and 11B each illustrate a change in a similar reflection coefficient when a phase is compensated under the same condition as that of FIG. 9. In some example embodiments, it is assumed that a look-up table generation frequency is the same as a carrier frequency.

Comparing FIG. 11A with FIG. 9, a similar reflection coefficient when an RB offset is 0 or 99 may be close to a similar reflection coefficient when the RB offset is 50. However, there still remains a phase error rotated about a central point of the look-up table 160a due to frequency characteristics of an antenna.

Referring to FIG. 11B, similar reflection coefficients may gather at one point regardless of an RB offset when a phase shift difference according to frequency characteristics of an antenna is compensated.

As such, in order to compensate for a phase difference according to a frequency of a reflection coefficient, data measured to calculate the reflection coefficient, in other words, sampled data, has to be based on a transmission signal of the same frequency. In LTE, a physical uplink shared channel (PUSCH) may have a different RB offset for each transmission time interval (TTI), and a physical uplink control channel (PUCCH) may have a different RB offset for each slot. Accordingly, when an LTE communication method is used, the parameter calculation module 120a may perform sampling according to a set forward direction and sampling according to a set reverse direction of the bidirectional coupler 230a in one slot.

When a look-up table generation frequency, that is, a reference frequency, and a carrier frequency are different from each other, a frequency offset between the reference frequency and the carrier frequency has to be compensated in operation S320 in which a phase difference according to frequency characteristics of an antenna is compensated, as explained with reference to FIG. 12.

Figure 12:
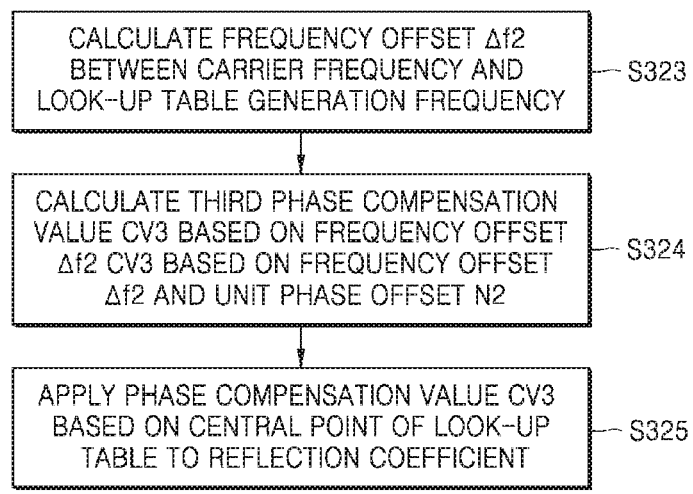
FIG. 12 is a flowchart of a method of compensating for a phase difference according to frequency characteristics of an antenna based on a frequency offset between a reference frequency and a carrier frequency according to some example embodiments.

FIG. 12 is a flowchart of a method of compensating for a phase difference according to frequency characteristics of an antenna (e.g., a second phase error) according to some example embodiments.

Referring to FIG. 12, in operation S323, the parameter calculation module 120a (see FIG. 4) may calculate a frequency offset Δf2 between a carrier frequency and a look-up table generation frequency (e.g., a reference frequency). The parameter calculation module 120a may calculate the frequency offset Δf2 based on a frequency difference between the look-up table generation frequency that is previously measured and stored and the set carrier frequency.

In operation S324, the parameter calculation module 120a may calculate a third phase compensation value CV3 based on the frequency offset Δf2 and the unit phase compensation value N1. The parameter calculation module 120a may calculate a product of the frequency offset Δf2 and the unit phase compensation value N1 as the third phase compensation value CV3. Restated, the parameter calculation module 120a, in operation S324, may calculate a third phase compensation value CV3 based on multiplying a unit phase compensation value N1 according to the residual delay offset by a second frequency offset Δf2 between a reference frequency and the carrier frequency. In some example embodiments, in operation S324, the parameter calculation module 120a may calculate a third phase compensation value CV3 based on the frequency offset Δf2 and the unit phase compensation value N2. The parameter calculation module 120a may calculate a product of the frequency offset Δf2 and the unit phase compensation value N2 as the third phase compensation value CV3. Restated, the parameter calculation module 120a, in operation S324, may calculate a third phase compensation value CV3 based on multiplying a unit phase compensation value N2 according to the frequency characteristics of the antenna by a second frequency offset Δf2 between a reference frequency and the carrier frequency.

In operation S325, the parameter calculation module 120a may apply the third phase compensation value CV2 based on a central point of the look-up table 160a to a reflection coefficient. The parameter calculation module 120a may compensate for a phase difference according to a frequency offset between a reference frequency and the carrier frequency by rotating a phase of the reflection coefficient by the third phase compensation value CV3 about the central point of the look-up table 160a. Restated, the parameter calculation module 120a, in operation S325, may change the phase of the reflection coefficient by the third phase compensation value about a central value of reflection coefficient values included in a look-up table.

Such compensation of a phase difference based on a frequency offset between a reference frequency and a carrier frequency may be performed after or before compensation of a phase difference based on a frequency offset between the carrier frequency and a transmission signal.

Figure 13:
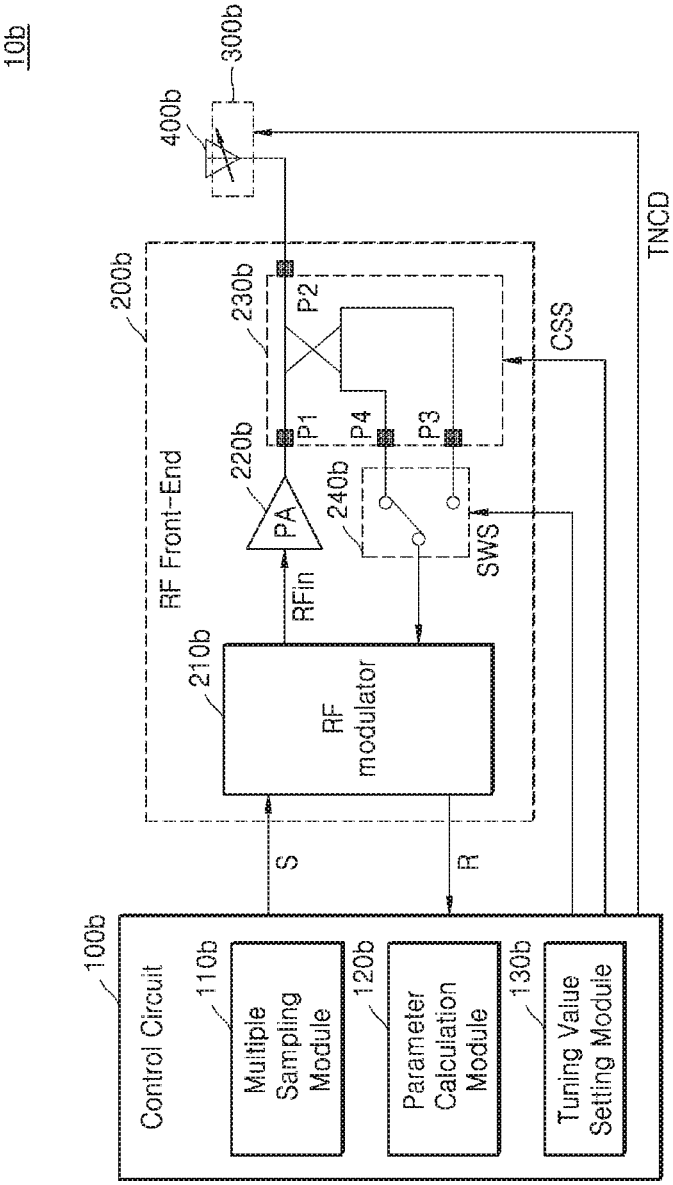
FIG. 13 is a block diagram of an antenna tuning device according to some example embodiments.

FIG. 13 is a block diagram of an antenna tuning device 10b according to some example embodiments. The antenna tuning device 10b of FIG. 13 may compensate for a resonance frequency of an antenna by adjusting an aperture tuner of an antenna based on a parameter (e.g., a VSWR) indicating normalized power of the reception signal R. Such a parameter and/or a plurality of such parameter values may be calculated based on sampling data.

Referring to FIG. 13, the antenna tuning device 10b may include a control circuit 100b, an RF front-end 200b (including RF modulator 210b, power amplifier 220b, bidirectional coupler 230b, and switch 240b), and an aperture tuner 300b. The aperture tuner 300b may be an element included in the antenna 400b.

A configuration and an operation of the RF front-end 200b of FIG. 13 are similar to those of the front-end 200a of FIG. 4. However, a bidirectional coupler 230b may be set to a reverse direction, and a switch 240b may apply a reverse reception signal output from the fourth port P4 to an RF modulator 210b. In some example embodiments, a reverse coupler may be used instead of the bidirectional coupler 230b and the switch 240b, and may apply a reverse reception signal to the RF modulator 210b. The RF modulator 210b may down-convert the reverse reception signal and may apply the down-converted reverse reception signal to the control circuit 100b.

The control circuit 100b may include a multiple sampling module 110b, a parameter calculation module 120b, and a tuning value setting module 130b. Also, the antenna tuning device 10b may further include other elements (e.g., the transmitter 140 and the receiver 150 of FIG. 3). A configuration and an operation of the control circuit 100b are similar to those of the control circuit 100 of FIG. 3, and the description made with reference to FIG. 3 may apply to the control circuit 100b of some example embodiments.

The multiple sampling module 110b may, to perform the multiple sampling, sample the transmission signal S and the reception signal R at least three times within a period for which a frequency to which the transmission signal S is allocated, in other words, a frequency of the RF transmission signal RFin, is constant. In some example embodiments, the reception signal R is the reverse reception signal. The multiple sampling module 110b may change a tuning code TNCD for changing a setting value of the aperture tuner 300b, and may sample the transmission signal S and the reverse reception signal whenever the tuning code TNCD is changed.

The parameter calculation module 120b may calculate a plurality of VSWR values, that is, at least three VSWR values, based on data obtained according to at least three sampling operations. The parameter calculation module 120b may calculate a VSWR value based on power of the transmission signal S and power of the reception signal R (specifically, the reverse reception signal). As the VSWR value decreases, a reflectance of the antenna 400b decreases. Accordingly, the tuning value setting module 130b may find a minimum parameter (e.g., VSWR) value by comparing a plurality of parameter (e.g., VSWR) values and may set a tuning value, that is, a tuning code, corresponding to the minimum value of the parameter (e.g., minimum VSWR value) as a tuning value. The aperture tuner 300b may compensate for a resonance frequency of the antenna ANT by changing an internal capacitance based on the received tuning code TNCD. Restated, the tuning code TNCD may be associated with adjusting a resonance frequency of the antenna ANT. The tuning code TNCD may be changed whenever sampling is performed during the multiple sampling.

Since the aperture tuner 300b is included in the antenna 400b, it is not easy to generate a look-up table by arbitrarily setting a reflection coefficient of the antenna 400b. Accordingly, for the purpose of antenna tuning, the antenna tuning device 10b may calculate a plurality of VSWR values by changing the tuning code TNCD for changing a setting value of the aperture tuner 300b and may set a tuning code corresponding to a minimum VSWR value by comparing the plurality of VSWR values.

Although a VSWR is described as a parameter indicating power of the reception signal R in FIG. 13, embodiments are not limited thereto and another type of parameter indicating normalized power of the reception signal R may be calculated and the aperture tuner 300b may be controlled based on the parameter.

Figure 14:
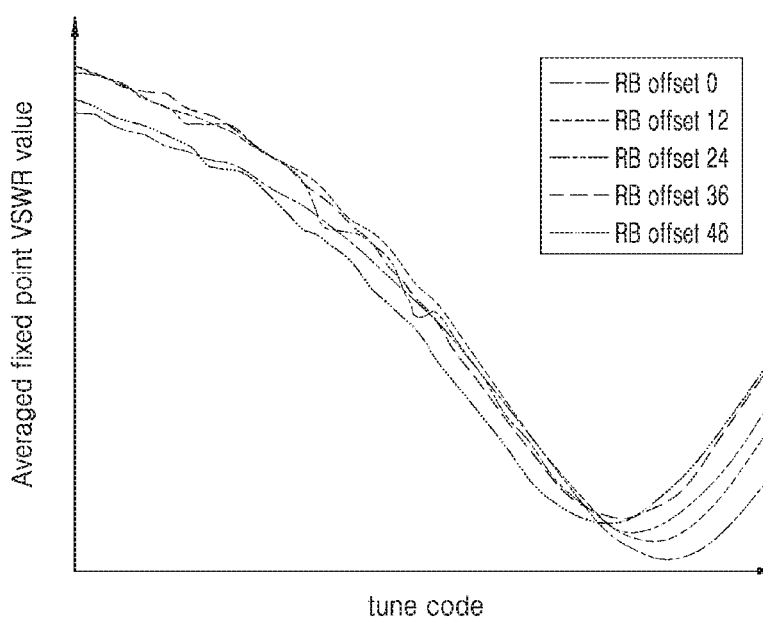
FIG. 14 is a graph illustrating a change in a voltage standing wave ratio (VSWR) according to an aperture tuner setting value according to some example embodiments.

FIG. 14 is a graph illustrating a change in a VSWR according to an aperture tuner setting value. Referring to FIG. 14, among a plurality of VSWR values calculated at the same frequency with the same RB offset, there may be a VSWR change trend according to a tuning code, that is, an aperture tuner setting value, and a minimum VSWR value and a tuning code corresponding to the minimum VSWR value may be obtained based on the VSWR change trend. When RB offsets are different and measured frequencies are different, it is difficult to obtain a VSWR change trend and thus it is not easy to obtain a minimum VSWR value. Accordingly, the antenna tuning device 10b (see FIG. 14) may calculate a plurality of VSWR values through multiple sampling at the same frequency, may derive a minimum VSWR value based on the calculated plurality of VSWR values, and may set a tuning code corresponding to the minimum VSWR value.

Figure 15:
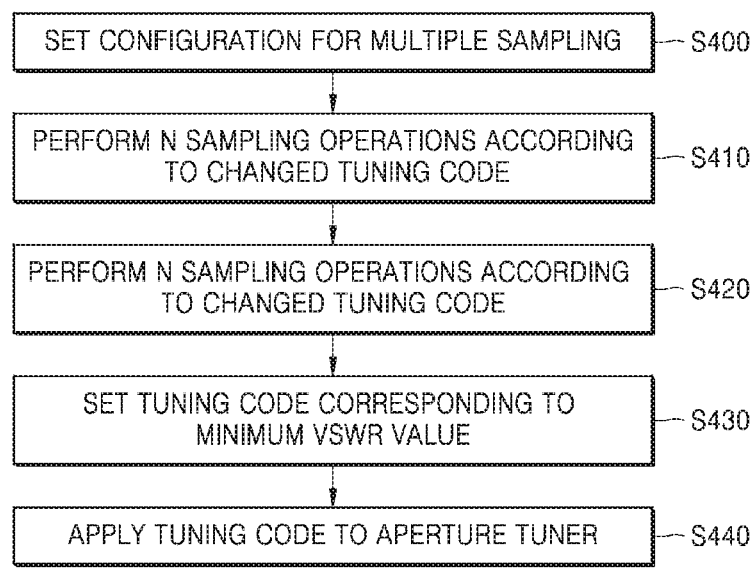
FIG. 15 is a flowchart of an aperture tuning method according to some example embodiments.

FIG. 15 is a flowchart of an aperture tuning method according to some example embodiments. The aperture tuning method of FIG. 15 may be performed by the antenna tuning device 10b of FIG. 13, and the description made with reference to FIG. 13 may apply to the aperture tuning method of FIG. 15.

Referring to FIGS. 15 and 13, in operation S400, the control circuit 100b may set a configuration for multiple sampling. The control circuit 100b may set an operation timing of configurations in the antenna tuning device 10b in order to perform multiple sampling. For example, an $n^{th}$ (n is an integer equal to or greater than 3) sampling start time, a sampling period, a time when the tuning code TNCD is changed, and a unit change value may be set. Since more VSWR values may be compared as more sampling operations are performed during a measurement period, the antenna tuning device 10b may set configurations so as to perform as many sampling operations as possible within the measurement period.

In operation S410, the multiple sampling module 110b may perform n sampling operations during a measurement period for which a frequency according to a changed tuning code is constant. The multiple sampling module 110b may change a tuning code n times (or n−1 times), and may sample a transmission signal and a reverse reception signal whenever the tuning code is changed.

In operation S420, the parameter calculation module 120b may calculate n VSWR values based on first through $n^{th}$ pieces of data obtained by the n sampling operations. Each of the first through $n^{th}$ pieces of data may include sampling data of the transmission signal and the reception signal. The parameter calculation module 120b may normalize power of the transmission signal and power of the reception signal, and may calculate VSWR values based on the normalized power of the transmission signal and the normalized power of the reception signal.

In operation S430, the tuning value setting module 130b may set a tuning code ("tuning value") corresponding to a minimum VSWR value. The tuning value setting module 130b may derive a minimum VSWR value by comparing the n VSWR values and may set a tuning code corresponding to the minimum VSWR value. For example, the tuning value setting module 130b may derive a smallest ("minimum") value from among the n VSWR values as the minimum VSWR value and may set a tuning code corresponding to the minimum VSWR value as the tuning value. Alternatively, the tuning value setting module 130b may calculate a VSWR change trend (e.g., a function showing a relationship between a tuning code value and a VSWR value) according to a tuning code based on the n VSWR values, and may calculate a minimum VSWR value based on the calculated change trend.

In operation S440, the tuning value setting module 130b may apply the tuning code to the aperture tuner 300b. The tuning value setting module 130b may provide the tuning code to the aperture tuner 300b. The aperture tuner 300b may compensate for an impedance mismatch by changing an internal capacitance or inductance based on the tuning code.

Figure 16:
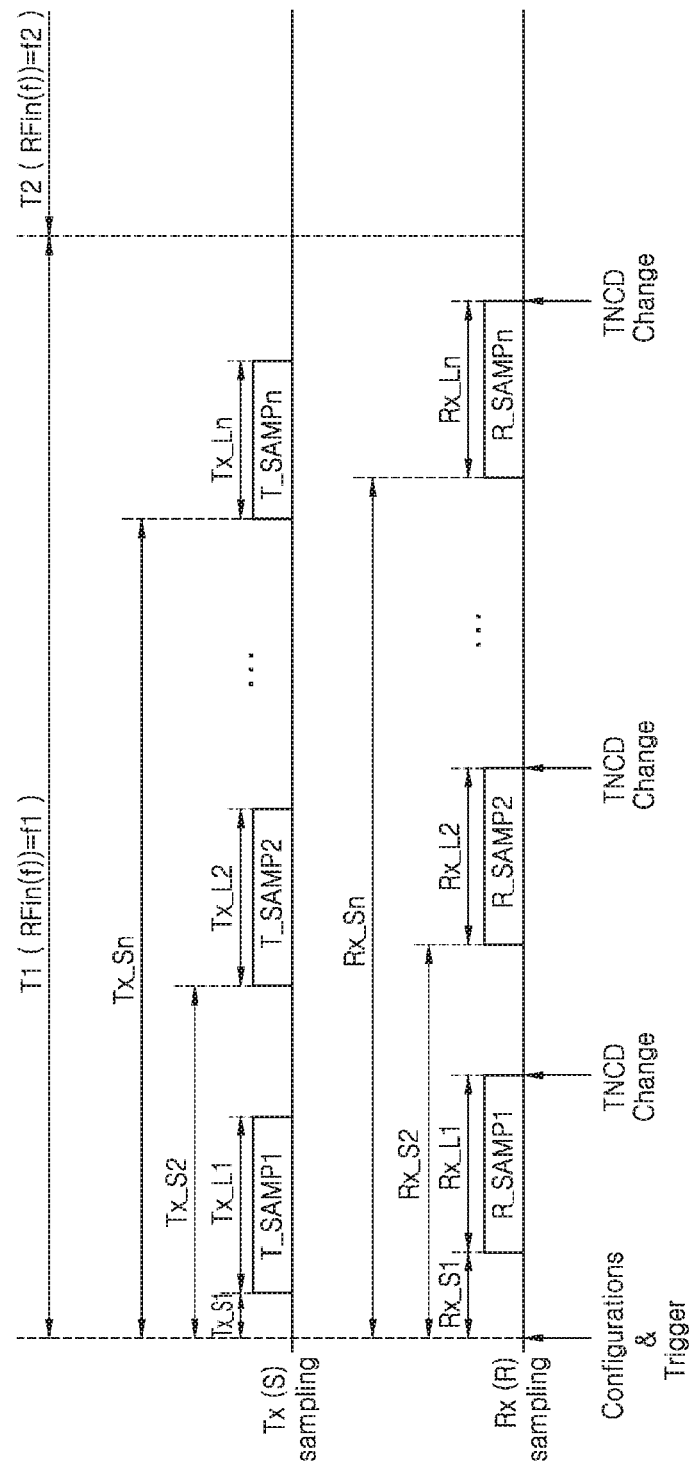
FIG. 16 illustrates multiple sampling according to some example embodiments.

FIG. 16 illustrates multiple sampling according to some example embodiments. The multiple sampling of FIG. 16 may be performed by the antenna tuning device 10b of FIG. 13.

Referring to FIGS. 16 and 4, n sampling operations may be performed during a measurement period, for example, the first period T1. The frequency RFin(f) of a modulated transmission signal may be the same during the first period T1. For example, the frequency RFin(f) of the modulated transmission signal may be set to the first frequency f1 during the first period T1. Next, the frequency RFin(f) of the modulated transmission signal may be set to the second frequency f2 during the second period T2. The first period T1 may correspond to (e.g., may be substantially common with), for example, one slot.

Configurations for multiple sampling may be set before the first period T1 starts. Sampling delay times (e.g., Tx_S1, Rx_S1, Tx_S2, Rx_S2, . . . , Tx_Sn, and Rx_Sn), sampling lengths (e.g., Tx_L1, Rx_L1, Tx_L2, Rx_L2, . . . , Tx_Ln, and Rx_Ln), a time when a tuning code is changed, and a change value of the tuning code may be set.

When a triggering signal is applied, the transmission signal S and the reception signal R may be sampled according to the set configurations. The tuning code TNCD may be changed whenever sampling is performed, and next sampling may be performed according to the changed tuning code TNCD.

Figure 17:
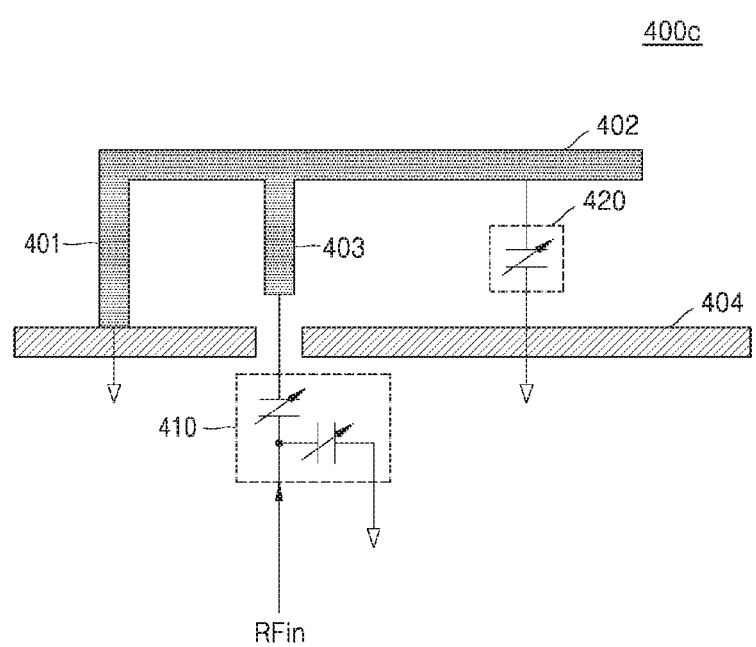
FIG. 17 illustrates an antenna including an impedance tuner and an aperture tuner according to some example embodiments.

FIG. 17 illustrates an antenna 400c including an impedance tuner 410 and an aperture tuner 420. The antenna 400c of FIG. 17 may include a planar inverted-F antenna.

The antenna 400c may include a shorting pin 401, a radiating element 402, a feed point 403, a ground plane 404, the impedance tuner 410, and the aperture tuner 420. The shorting pin 401 connects the antenna 400c to the ground plane 404. The radiating element 402 may receive or radiate a free space wave. The feed point 403 may receive an input of the antenna, for example, the RF reception signal RFin, through the impedance tuner 410.

The antenna 400c may be connected to the antenna tuning device 10a of FIG. 4, and an impedance and a resonance frequency may be compensated under the control of the control circuit 100a. A tuning value may be set according to an impedance tuning method through multiple sampling described with reference to FIGS. 4 through 12, and may be applied as the tuning control signal TCS (see FIG. 4) to the impedance tuner 410. The impedance tuner 410 may change an internal capacitance based on the tuning control signal TCS.

Also, a tuning code may be set according to an aperture tuning method through multiple sampling described with reference to FIGS. 13 through 16, and may be applied to the aperture tuner 420. The aperture tuner 420 may change an internal capacitance based on the tuning code.

Accordingly, a magnitude and a phase of the antenna 400c, and a resonance frequency may be changed according to a tuning value and a tuning code (the tuning code may be changed) whenever sampling is performed during the performing of multiple sampling, and output efficiency of the antenna 400c may be improved. Restated, a control circuit (e.g., control circuit 100) may be configured to control an antenna tuner (e.g., antenna tuner 300) to change the resonance frequency in each sampling period in which multiple sampling is performed. The control circuit may further calculate a plurality of parameter values according to the changed resonance frequency based on the sampling data.

Impedance tuning and aperture tuning may be performed within a measurement period for which a frequency to which a transmission signal is allocated, for example, a frequency of the RF reception signal RFin, is constant, as explained with reference to FIG. 18.

Figure 18:
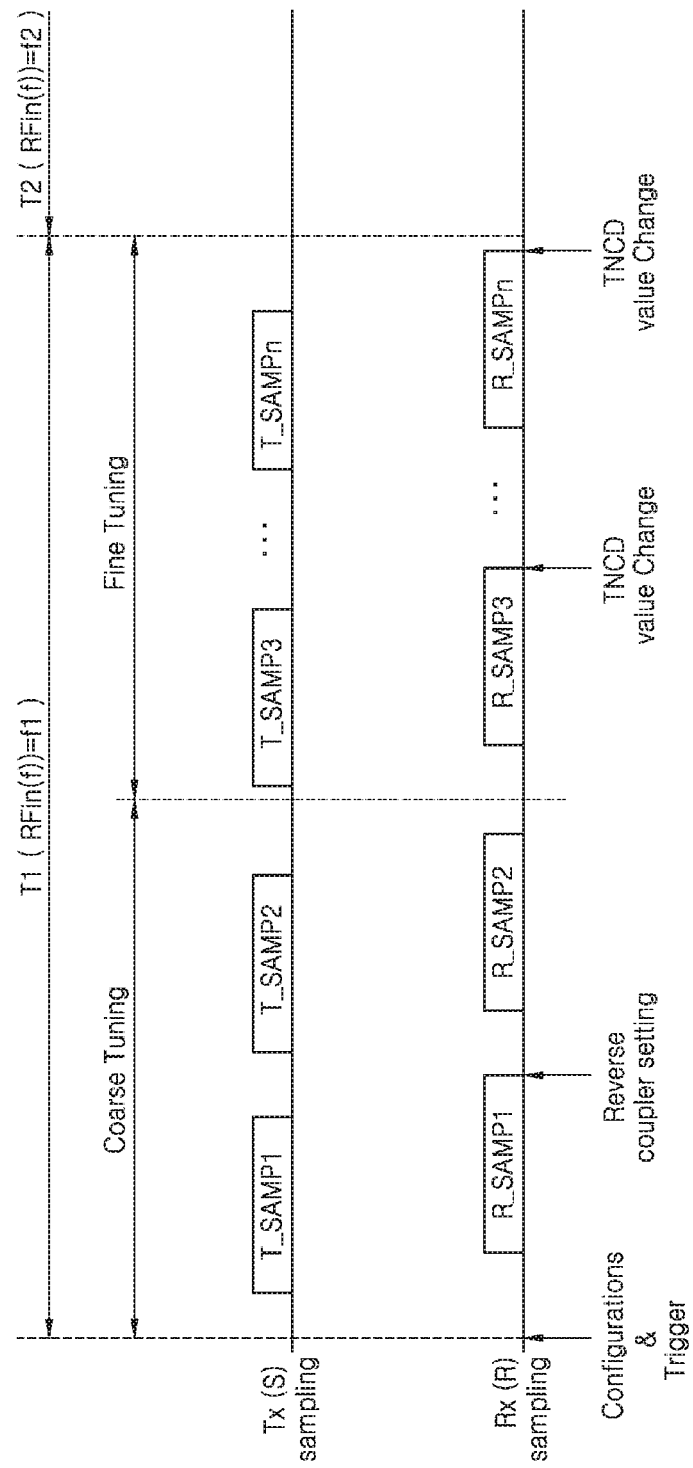
FIG. 18 illustrates multiple sampling according to some example embodiments.

FIG. 18 illustrates multiple sampling according to some example embodiments. The multiple sampling of FIG. 18 may be performed by an antenna tuning device, for example, the antenna tuning device 10a of FIG. 4, connected to the antenna 400c of FIG. 17.

Referring to FIG. 18, a plurality of sampling operations (e.g., n sampling operations) may be performed during a measurement period (e.g., the first period T1), at least two sampling operations for impedance matching may be performed during a coarse tuning period, and at least two sampling operations for aperture tuning may be performed during a fine tuning period. During the coarse tuning period, sampling may be performed and then a direction of a coupler may be changed. During the fine tuning period, sampling may be performed and then the tuning code TNCD may be changed. Accordingly, impedance matching may be performed during the coarse tuning period and aperture tuning may be performed during the fine tuning period.

Figure 19:
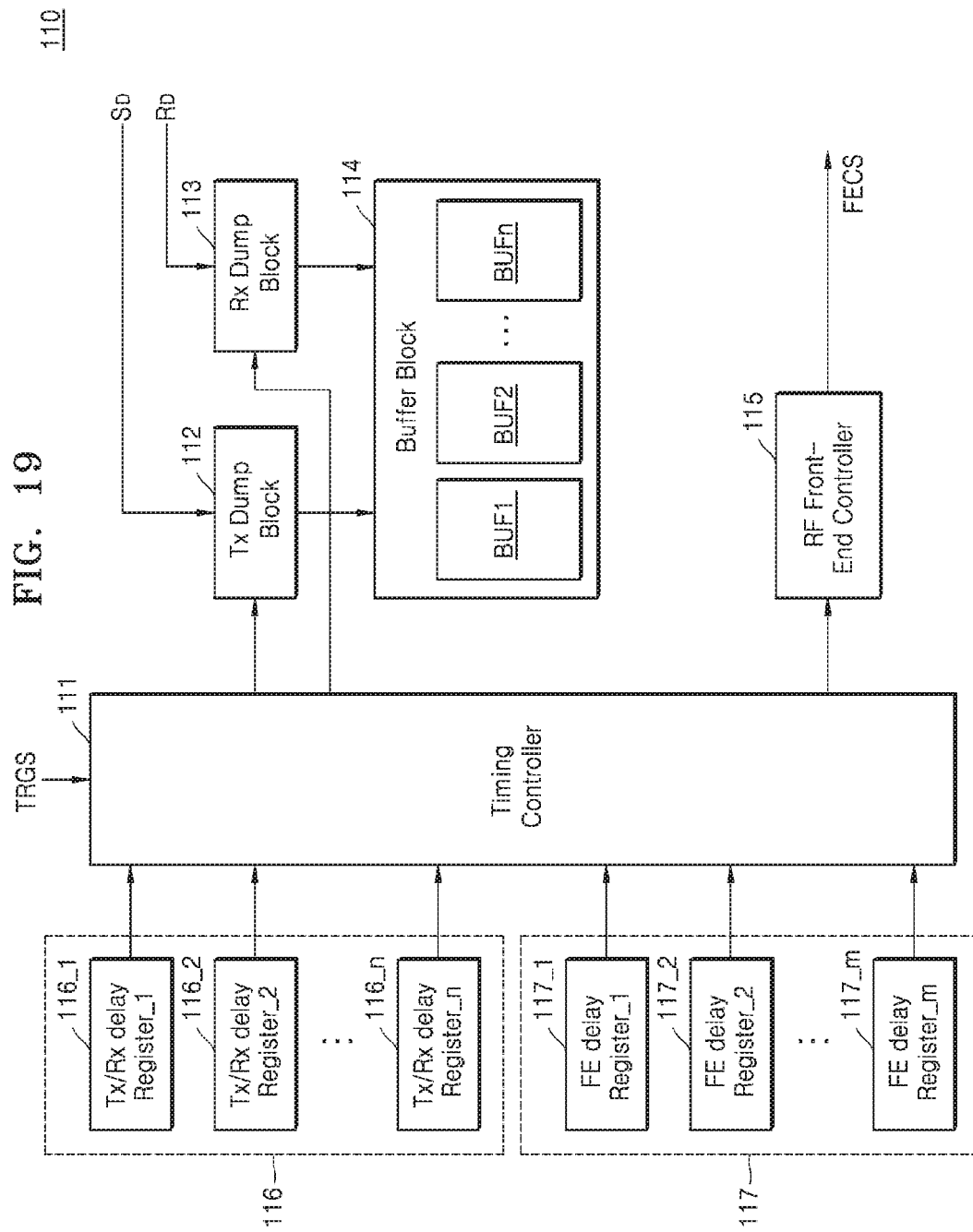
FIG. 19 illustrates a multiple sampling module according to some example embodiments.

FIG. 19 illustrates the multiple sampling module 110 according to some example embodiments. The multiple sampling module 110 of FIG. 19 may be applied to any of the antenna tuning devices 10, 10a, and 10b of FIGS. 1, 4, and 13.

Referring to FIG. 19, the multiple sampling module 110 may include a timing controller 111, a transmission dump block 112, a reception dump block 113, a buffer block 114, an RF front-end controller 115, a first register unit 116, and a second register unit 117.

The timing controller 111 may control a timing related to multiple sampling. The timing controller 111 may control a timing of configurations of the antenna tuning device 10 of FIG. 1, 10a of FIG. 4, or 10b of FIG. 13 for performing multiple sampling based on various pieces of delay information stored in the first register unit 116 and the second register unit 117.

The first register unit 116 may include a plurality of transmission/reception delay registers, e.g., first through nth transmission/reception delay registers 116_1 through 116_n, and delay information related to sampling of the transmission signal S and the reception signal R, for example, delay information related to a sampling time or a sampling length, may be stored in each of the first through nth transmission/reception delay registers 116_1 through 116_n. Delay information related to first sampling may be stored in the first transmission/reception delay register 116_1. Delay information related to second sampling may be stored in the second transmission/reception delay register 116_2. As such, delay information related to sampling of the transmission signal S and the reception signal R according to a corresponding sampling order may be stored in each of the first through nth transmission/reception delay registers 116_1 through 116_n.

The second register unit 117 may include a plurality of front-end delay registers, e.g., first through mth front-end delay registers 117_1 through 117_m. Delay information related to a setting change of configurations of the RF front-end 200 of FIG. 1, 200a of FIG. 4, or 200b of FIG. 13 may be stored in each of the first through mth front-end delay registers 117_1 through 117_m. For example, delay information may include delay information related to a setting change of a direction of the bidirectional coupler 230a (see FIG. 4), delay information related to a setting change of the switch 240a (see FIG. 4), and delay information related to a change of the tuning code TNCD (see FIG. 13). Delay information related to a setting change of configurations of the RF front-end after first sampling may be stored in the first front-end delay register 117_1, and delay information related to a setting change of configurations of the RF front-end after second sampling may be stored in the second front-end delay register 117_2. As such, delay information related to a setting change of configurations of the RF front-end according to a corresponding sampling order may be stored in each of the first through mth front-end delay registers 117_1 through 117_m.

The timing controller 111 may apply timing information related to multiple sampling to the transmission dump block 112 and the reception dump block 113 based on the delay information stored in the first register unit 116 and a trigger signal TRGS received from the outside, for example, a microcontroller. Also, the timing controller 111 may apply timing information related to multiple sampling to the RF front-end controller 115 based on the delay information stored in the second register unit 117 and the trigger signal TRGS.

The transmission dump block 112 and the reception dump block 113 may perform multiple sampling on the transmission data $S_D$ and the reception data $R_D$ during a measurement period based on the timing information applied from the timing controller 111, and may store the sampled data in the buffer block 114.

The buffer block 114 may include a plurality of buffers BUF1, BUF2, . . . , and BUFn. Transmission data and reception data according to first sampling may be stored in the first buffer BUF1. Transmission data and reception data according to second sampling may be stored in the second buffer BUF2. Sampling data obtained according to a corresponding sampling order may be stored in each of the plurality of buffers BUF1, BUF2, . . . , and BUFn.

The RF front-end controller 115 may generate a front-end control signal FECS based on the timing information applied from the timing controller 111. For example, the front-end control signal FECS may include the coupler setting signal CSS (see FIG. 4), the switch signal SWS (see FIG. 4), and the tuning code TNCD (see FIG. 13) applied to the aperture tuner 300b (see FIG. 13) during antenna tuning.

Figure 20:
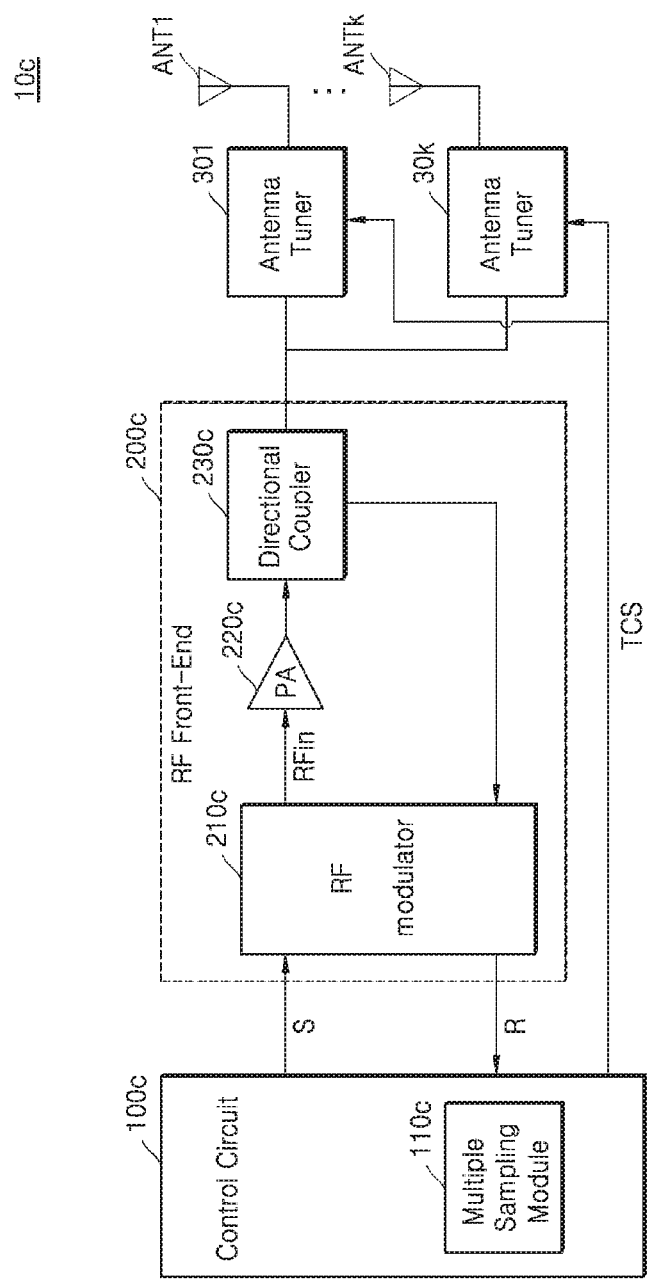
FIG. 20 is a block diagram of an antenna tuning device according to some example embodiments.

FIG. 20 is a block diagram of an antenna tuning device 10c according to some example embodiments.

Referring to FIG. 20, the antenna tuning device 10c may include a control circuit 100c (including multiple sampling module 110c), an RF front-end 200c (including an RF modulator 210c, a power amplifier 220c, and a directional coupler 230c), and a plurality of antenna tuners 301 through 30k. The plurality of antenna tuners 301 through 30k may be respectively connected to a plurality of antennas ANT1 through ANTk. The number of the plurality of antennas ANT1 through ANTk may vary according to use including an RF band, radio access technology (RAT), a multi-input multi-output (MIMO), or beam forming.

Although the plurality of antenna tuners 301 through 30k are connected to one directional coupler 230c in FIG. 20, embodiments are not limited thereto and the plurality of antenna tuners 301 through 30k may be connected to different directional couplers or may be connected to a plurality of directional couplers.

A configuration and an operation of the control circuit 100c and the RF front-end 200c of FIG. 20 are similar to those of the control circuit 100 and the RF front-end 200 of FIG. 1, and thus a repeated explanation thereof will not be given.

The antenna tuning device 10c may perform impedance tuning or aperture tuning based on multiple sampling described with reference to FIGS. 1 through 19. In some example embodiments, when frequencies allocated to transmission signals transmitted through the plurality of antennas ANT1 through ANTk are the same, antenna tuning may be performed on one of the plurality of antennas ANT1 through ANTk, and the tuning control signal TCS generated according to the antenna tuning may be applied to the plurality of antenna tuners 301 through 30k. In some example embodiments, antenna tuning may be simultaneously performed on the plurality of antennas ANT1 through ANTk, and the same tuning control signal TCS may be applied to the plurality of antenna tuners 301 through 30k. In some example embodiments, antenna tuning may be simultaneously performed on the plurality of antennas ANT1 through ANTk, and as a result, different tuning control signals TCS may be applied to the plurality of antenna tuners 301 through 30k.

When frequencies allocated to transmission signals transmitted through the plurality of antennas ANT1 through ANTk are different from one another, antenna tuning may be sequentially performed on the plurality of antennas ANT1 through ANTk. For example, antenna tuning may be sequentially performed on the plurality of antennas ANT1 through ANTk during a plurality of measurement periods, and the tuning control signal TCS according to the antenna tuning may be applied to a corresponding antenna tuning module. In some example embodiments, antenna tuning may be simultaneously performed on the plurality of antennas ANT1 through ANTk, and as a result, different tuning control signals TCS may be applied to the plurality of antenna tuners 301 through 30k.

Figure 21:
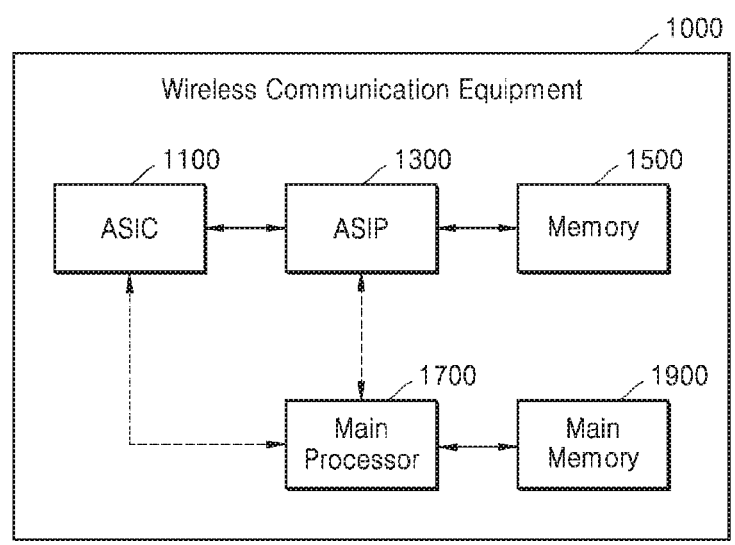
FIG. 21 is a block diagram of wireless communication equipment according to some example embodiments.

FIG. 21 is a block diagram of wireless communication equipment 1000 according to some example embodiments. As shown in FIG. 21, the wireless communication equipment 1000 may include an application-specific integrated circuit (ASIC) 1100, an application-specific instruction set processor (ASIP) 1300, a memory 1500, a main processor 1700, and a main memory 1900. Two or more from among the ASIC 1100, the ASIP 1300, and the main processor 1700 may communicate with one another. Also, two or more from among the ASIC 1100, the ASIP 1300, the memory 1500, the main processor 1700, and the main memory 1900 may be integrated into one chip.

The ASIC 1100 that is an integrated circuit customized for a particular use may include, for example, a radio frequency integrated circuit (RFIC), a modulator, and/or a demodulator. The ASIP 1300 may support an instruction set for a specific application, and may execute instructions included in the instruction set. The memory 1500 may communicate with the ASIP 1300, and may act as a non-transitory storage device and may store a plurality of instructions executed by the ASIP 1300. The memory 1500 may also store pieces of data generated when the ASIP 1300 executes the plurality of instructions. For example, the memory 1500 may be random-access memory (RAM), read-only memory (ROM), tape, a magnetic disk, an optical disk, a volatile memory, a nonvolatile memory, or a combination thereof. Also, the memory 1500 may include any type of memory that may be accessed by the ASIP 1300.

The main processor 1700 may control the wireless communication equipment 1000 by executing a plurality of instructions. For example, the main processor 1700 may control the ASIC 1100 and the ASIP 1300, and may process data received through a wireless communication network or may process an input of a user of the wireless communication equipment 1000. The main memory 1900 may communicate with the main processor 1700, and may act as a non-transitory storage device and may store the plurality of instructions executed by the main processor 1700. For example, the main memory 1900 may include any type of memory that may be accessed by the main processor 1700, for example, RAM, ROM, tape, a magnetic disk, an optical disk, a volatile memory, a nonvolatile memory, or a combination thereof.

An element of the antenna tuning device 10 of FIG. 1, 10a of FIG. 4, 10b of FIG. 13, or 10c of FIG. 20 according to the above embodiments may be included in at least one of elements included in the wireless communication equipment 1000 of FIG. 21, and the above-described antenna tuning method may be performed by at least one from among the elements included in the wireless communication equipment 1000.

For example, at least one from among the multiple sampling module 110, the parameter calculation module 120, and the tuning value setting module 130 of FIG. 3 may be implemented as one hardware block and may be included in the ASIC 1100. Alternatively, at least one from among the multiple sampling module 110, the parameter calculation module 120, and the tuning value setting module 130 may be implemented as a plurality of instructions and may be stored in the memory 1500. A function of at least one of the multiple sampling module 110, the parameter calculation module 120, and the tuning value setting module 130 may be performed when the ASIP 1300 executes the plurality of instructions stored in the memory 1500. Also, at least one of the antenna tuning methods according to embodiments may be implemented as a plurality of instructions and may be stored in the memory 1500, and at least one of the antenna tuning methods may be performed when the ASIP 1300 executes the stored plurality of instructions.

Alternatively, at least one from among the multiple sampling module 110, the parameter calculation module 120, and the tuning value setting module 130 of FIG. 4 or at least one from among the antenna tuning methods may be implemented as a plurality of instructions stored in the main memory 1900, and a function of at least one of the multiple sampling module 110, the parameter calculation module 120, and the tuning value setting module 130 or at least one of the antenna tuning methods may be performed when the main processor 1700 executes the plurality of instructions stored in the main memory 1900.

While the inventive concepts has been particularly shown and described with reference to embodiments thereof, it will be understood that various changes in form and details may be made therein without departing from the spirit and scope of the following claims. Accordingly, the technical scope of the inventive concepts is defined by the following claims.

What is claimed is:

1. An antenna tuning method of wireless communication equipment, the antenna tuning method comprising:
    performing multiple sampling based on transmission signals applied to an antenna and reception signals corresponding to the transmission signals during a measurement period for which a first frequency is allocated to the transmission signals, such that a plurality of instances of sampling data are generated based on the multiple sampling, each instance of sampling data including data corresponding to the transmission signal and data corresponding to the reception signals;
    calculating a parameter associated with antenna tuning based on the plurality of instances of sampling data; and
    tuning the antenna based on the parameter,
    wherein the transmission signals include a first transmission signal and a second transmission signal, the first transmission signal and the second transmission signal sequentially applied to the antenna during the measurement period, and
    the performing of the multiple sampling includes
        performing first sampling on both the first transmission signal and a first reception signal, the first reception signal corresponding to a return signal of the first transmission signal; and
        performing second sampling on both the second transmission signal and a second reception signal, the second reception signal corresponding to a reflection signal of the second transmission signal.

2. The antenna tuning method of claim 1, further comprising:
    setting a configuration associated with the multiple sampling,
    wherein the performing of the multiple sampling includes changing a direction of a bidirectional coupler during the measurement period, the bidirectional coupler associated with applying the transmission signals to the antenna according to the setting of the configuration, the changing the direction of the bidirectional coupler during the measurement period includes setting the direction of the bidirectional coupler to a forward direction prior to performing the first sampling and setting the direction of the bidirectional coupler to a reverse direction subsequent to performing the first sampling and prior to performing the second sampling.

3. The antenna tuning method of claim 1, wherein the calculating of the parameter includes
    calculating a reflection coefficient based on first sampling data obtained in the first sampling and second sampling data obtained in the second sampling; and
    compensating for at least one from among a magnitude and a phase of the reflection coefficient to generate a compensated reflection coefficient based on a reference frequency.

4. The antenna tuning method of claim 3, wherein the reflection coefficient is calculated based on a ratio between
    a maximum value of a correlation between the first transmission signal and the first reception signal, and
    a maximum value of a correlation between the second transmission signal and the second reception signal.

5. The antenna tuning method of claim 3, wherein the tuning of the antenna includes
    selecting a tuning value corresponding to the compensated reflection coefficient in a look-up table generated based on the reference frequency; and
    adjusting an impedance of the antenna based on an antenna impedance control signal corresponding to the tuning value.

6. The antenna tuning method of claim 3, wherein the compensating includes
    compensating for a first phase error of the reflection coefficient according to a residual delay offset difference between the first reception signal and the second reception signal; and
    compensating for a second phase error of the reflection coefficient according to frequency characteristics of the antenna.

7. The antenna tuning method of claim 6, wherein the compensating of the first phase error includes
    calculating a first phase compensation value based on multiplying a first unit phase compensation value according to the residual delay offset by a first frequency offset between a carrier frequency and the first frequency; and
    changing the phase of the reflection coefficient by the first phase compensation value about an origin on a complex plane.

8. The antenna tuning method of claim 6, wherein the compensating of the second phase error includes
    calculating a second phase compensation value based on multiplying a second unit phase compensation value according to the frequency characteristics of the antenna by a first frequency offset between a carrier frequency and the first frequency; and
    changing the phase of the reflection coefficient by the second phase compensation value about a central value of reflection coefficient values included in a look-up table.

9. The antenna tuning method of claim 8, wherein the compensating of the second phase error includes
    calculating a third phase compensation value based on multiplying the second unit phase compensation value according to the frequency characteristics of the antenna by a second frequency offset between the reference frequency and the carrier frequency; and
    changing the phase of the reflection coefficient by the third phase compensation value about the central value of reflection coefficient values included in the look-up table.

10. The antenna tuning method of claim 1, wherein
    the first reception signal is a first reflection signal of the first transmission signal,
    the second reception signal is a second reflection signal of the second transmission signal, and
    the multiple sampling includes sampling the first and second transmission signals and the first and second reception signals at least three times.

11. The antenna tuning method of claim 1, wherein the measurement period is substantially common with one slot.

12. An antenna tuning method of wireless communication equipment, the antenna tuning method comprising:
    performing multiple sampling based on transmission signals applied to an antenna and reception signals corresponding to the transmission signals during a measurement period for which a first frequency is allocated to the transmission signals, such that a plurality of instances of sampling data are generated based on the multiple sampling, each instance of sampling data including data corresponding to the transmission signal and data corresponding to the reception signals;

calculating a parameter associated with antenna tuning based on the plurality of instances of sampling data; and tuning the antenna based on the parameter, wherein the calculating of the parameter includes calculating a reflection coefficient based on first sampling data obtained in a first sampling and second sampling data obtained in a second sampling; and compensating for at least one from among a magnitude and a phase of the reflection coefficient to generate a compensated reflection coefficient based on a reference frequency.

* * * * *